(12) United States Patent
Liu et al.

(10) Patent No.: US 11,131,182 B2
(45) Date of Patent: Sep. 28, 2021

(54) METHODS FOR CHARACTERIZING MULTI-STRING CASED WELLS USING WIDE FREQUENCY BANDWIDTH SIGNALS

(71) Applicant: SCHLUMBERGER TECHNOLOGY CORPORATION, Sugar Land, TX (US)

(72) Inventors: Yang Liu, Cambridge, MA (US); Bikash K. Sinha, Cambridge, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 188 days.

(21) Appl. No.: 16/495,412

(22) PCT Filed: Mar. 27, 2018

(86) PCT No.: PCT/US2018/024446
§ 371 (c)(1),
(2) Date: Sep. 19, 2019

(87) PCT Pub. No.: WO2018/183246
PCT Pub. Date: Oct. 4, 2018

(65) Prior Publication Data
US 2020/0072040 A1 Mar. 5, 2020

Related U.S. Application Data

(60) Provisional application No. 62/476,909, filed on Mar. 27, 2017.

(51) Int. Cl.
*E21B 47/047* (2012.01)
*E21B 47/16* (2006.01)
*G01V 1/50* (2006.01)

(52) U.S. Cl.
CPC ............ *E21B 47/047* (2020.05); *E21B 47/16* (2013.01); *G01V 1/50* (2013.01); *G01V 2210/6161* (2013.01); *G01V 2210/6169* (2013.01)

(58) Field of Classification Search
CPC . E21B 47/047; E21B 47/16; G01N 2291/014; G01N 2291/018;
(Continued)

(56) References Cited

U.S. PATENT DOCUMENTS

| 4,594,691 A | 6/1986 | Kimball et al. |
| 2006/0262643 A1 | 11/2006 | Blankinship et al. |

(Continued)

FOREIGN PATENT DOCUMENTS

| WO | 2016187240 A1 | 11/2016 | |
| WO | WO-2016187240 A1 * | 11/2016 | ............. E21B 47/14 |

OTHER PUBLICATIONS

R. van Kuijk et al., "A Novel Ultrasonic Cased-Hole Imager for Enhanced Cement Evaluation", This paper was prepared for presentation at the International Petroleum Technology Conference held in Doha, Qatar, Nov. 21-23, 2005. (Year: 2005).*

Ekstrom, M. P., "Dispersion Estimation from Borehole Acoustic Arrays Using a Modified Matrix Pencil Algorithm," Conference Record of the Twenty-Ninth Asilomar Conference on Signals, Systems and Computers, 1995, vol. 1, pp. 449-453.

(Continued)

*Primary Examiner* — Regis J Betsch
(74) *Attorney, Agent, or Firm* — Trevor G. Grove

(57) ABSTRACT

Methods are provided for estimating a quality of cement in the annuli of a multi-string wellbore. Wideband acoustic energy signals are generated and detected in the wellbore and are processed to obtain indications of wideband casing-formation phase slowness dispersions in the wellbore. The indications are compared to reference wideband model casing-formation phase slowness dispersions in order to estimate status of cement or lack of cement in the annuli at that location based on the results of the comparison.

20 Claims, 28 Drawing Sheets

(58) Field of Classification Search
CPC ... G01N 2291/0232; G01N 2291/0258; G01N 29/12; G01N 29/262; G01N 29/343; G01N 29/348; G01N 29/4427; G01N 29/46; G01V 1/50; G01V 2210/6161; G01V 2210/6169

See application file for complete search history.

(56) References Cited

U.S. PATENT DOCUMENTS

| | | |
|---|---|---|
| 2013/0289881 A1 | 10/2013 | Sinha |
| 2015/0198032 A1 | 7/2015 | Sinha et al. |
| 2015/0219780 A1* | 8/2015 | Zeroug ............... E21B 49/003 702/6 |
| 2016/0061029 A1 | 3/2016 | Hayman |

OTHER PUBLICATIONS

Lu, C.-C. et al., "A three-dimensional dyadic Green's function for elastic waves in multilayer cylindrical structures", Journal of Acoustical Society of America, 1995, 98(5), pp. 2825-2835.

Li, J. et al., "Implementing Guided Wave Mode Control by Use of a Phased Transducer Array", IEEE Transactions on Ultrasonics, Ferroelectrics, and Frequency Control, 2001, 48(3), pp. 761-768.

Kimball, C. V. et al., "Semblance processing of borehole acoustic array data", Geophysics, 1984, 49(3), pp. 274-281.

Liu, et al., "Acoustic Guided Waves in Cylindrical Solid-Fluid Structures: Modeling with a Sweeping Frequency Finite Element Method and Experimental Validation," 43rd Annual Review of Progress in Quantitative Nondestructive Evaluation (QNDE), 2016.

Michaels, et al., "Chip excitation of ultrasonic guided waves," Ultrasonics 53, 2013, pp. 265-270.

\* cited by examiner

METHODS FOR CHARACTERIZING MULTI-STRING CASED WELLS USING WIDE FREQUENCY BANDWIDTH SIGNALS

CROSS-REFERENCE TO RELATED APPLICATIONS

The present document is based on and claims priority to U.S. Provisional Application Ser. No. 62/476,909, filed Mar. 27, 2017, which is incorporated herein by reference in its entirety.

TECHNICAL FIELD

The subject disclosure relates to well logging in the oil and gas field. More particularly, the subject disclosure relates to methods utilizing acoustic tools for analyzing the quality of cement in the annuli of a doubly cased well.

BACKGROUND

In developing an oilfield, a wellbore is drilled, and steel casings and cement slurry are placed to ensure structural support, protection from fluid invasion, and to provide zonal isolation. Over the lifespan of a cased borehole, damage to the cement sheath(s) may result from, among other things, improper cementing practices, casing eccentering, and stress fluctuations due to downhole operations such as pressure integrity testing, increased mud weight, casing perforation, stimulation, oil or gas production, and large wellbore temperature variations. In some cases, highly pressurized downhole fluid squeezes through micro-channels within the cement sheath, or through small gaps at one or both of the casing-cement or cement-formation interfaces (micro annulus) facilitating hydraulic communication. The consequences of hydraulic communication include jeopardizing hydrocarbon production efficiency, inducing casing corrosion, or even catastrophic environmental issues resulting from the leakage of toxic fluids.

To ensure well integrity and maintain environment-friendly production of hydrocarbons, sonic and ultrasonics have been widely used for nondestructive evaluation and structural health monitoring of the cement annuli. These techniques provide different measurement modalities for well integrity evaluation through the development of various acoustic tools such as Cement Bond Logs (CBLs), Variable Density Logs (VDL—a trademark of Schlumberger), Ultra-Sonic Imager (USI—a trademark of Schlumberger) and Isolation Scanner, etc. CBL data are acquired through a pitch-catch mode of a sonic logging tool with a monopole transducer and two monopole receivers. The low frequency casing extensional modes (10 kHz to 20 kHz) are actuated and the amplitude of the sonic waveforms are used as indicators of the bond quality between cement and outer casing surface. Also, the waveforms are displayed in a VDL format for important qualitative interpretation. The USI tool operates in a pulse-echo mode that excites the casing into the thickness-resonance mode. This resonant frequency (250 kHz to 700 kHz) is dependent on casing thickness while the amplitude decay is dependent on acoustic impedances of the media on either side of the casing. Acoustic impedance can be used to classify the medium as gas, liquid or cement based on a threshold set for acoustic impedance boundaries between these materials. To characterize lightweight, or mud contaminated cements that are of low acoustic impedance, a Flexural Wave Imaging (FWI) technique has been integrated with the pulse-echo measurement. The combined tool, called Isolation Scanner (a trademark of Schlumberger), provides excellent, detailed interpretations of the cement sheath. The FWI measurement employs an oblique incidence technique to actuate the dispersive flexural mode in the casing (AO mode in a plate approximation), for which the attenuation is sensitive to the material behind the casing. Further, FWI yields under certain conditions reflection echoes from the third interface (TIE) that provide further information about the cement sheath and geometry of the hole.

Despite all of the success of the aforementioned sonic and ultrasonic measurement tools, the sensitivity of current tools is limited to within the inner cement annulus while leaving the rest of the cement sheath and bonding interfaces uninspected.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure include generating wide bandwidth excitation signals inside a multi-string cased well, recording waveforms resulting from the wide bandwidth excitation signals, processing the recorded waveforms to generate full spectral slowness dispersion determinations, and comparing the spectral slowness dispersion determinations to reference wideband spectral dispersions for an intact wellbore with well-cemented annuli to identify possible cement degradations in one or more of the annuli of the multi-string cased well and/or possible bonding weaknesses at one or more of the cement-casing or cement-formation interfaces. For purposes of the specification and claims, the term "wideband" or "wide bandwidth" is to be understood as encompassing a bandwidth in which at least the five lowest order slowness dispersion modes of a well-cemented system can be identified. In many cases, and depending upon the geometry of the multi-string cased well, the five lowest order slowness dispersion modes can be identified in a range extending from 5 kHz to 70 kHz.

In certain embodiments, the wideband excitation signals are selected to permit at least the six lowest order slowness dispersion modes of a well-cemented system to be identified. In some embodiments, the wideband signals cover a range extending from 5 kHz to 100 kHz, although lower and/or higher frequencies can be encompassed such as, by way of example only, a bandwidth of 500 Hz to 100 kHz.

According to one embodiment, a chirp transmitter is used to generate a wideband signal. The chirp transmitter may take the form of a piezoelectric or magnetostrictive transducer or some other type of transducer.

In some embodiments, the spectral slowness dispersion determinations are compared to multiple reference wideband spectral dispersions which represent different wellbore scenarios including an intact wellbore with well-cemented annuli and a wellbore with cement degradations in one or more of the annuli of the multi-string cased well and/or possible bonding weaknesses at one or more of the cement-casing or cement-formation interfaces.

In some embodiments, in addition to generating wide bandwidth excitation signals at locations along the borehole or wellbore (the terms "borehole", "hole", "wellbore", and "well" being used interchangeably herein), one or more narrowband signals are generated, and resulting waveforms are recorded in order to identify an axial location along the borehole where the wellbore scenario changes, e.g., from well-cemented to not well cemented. In this manner, a cement to fluid transition may be identified.

Additional aspects, embodiments, objects and advantages of the disclosed methods may be understood with reference to the following detailed description taken in conjunction with the provided drawings.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

A cased borehole may be viewed as a multilayered cylindrical waveguide extending to infinity along an axis (z) of a borehole. The cased borehole system is usually composed of steel casings and cement annuli that are embedded in what may be considered an infinite formation. Drilling fluid is considered to fill the inside of the innermost steel casing.

Figure 1:
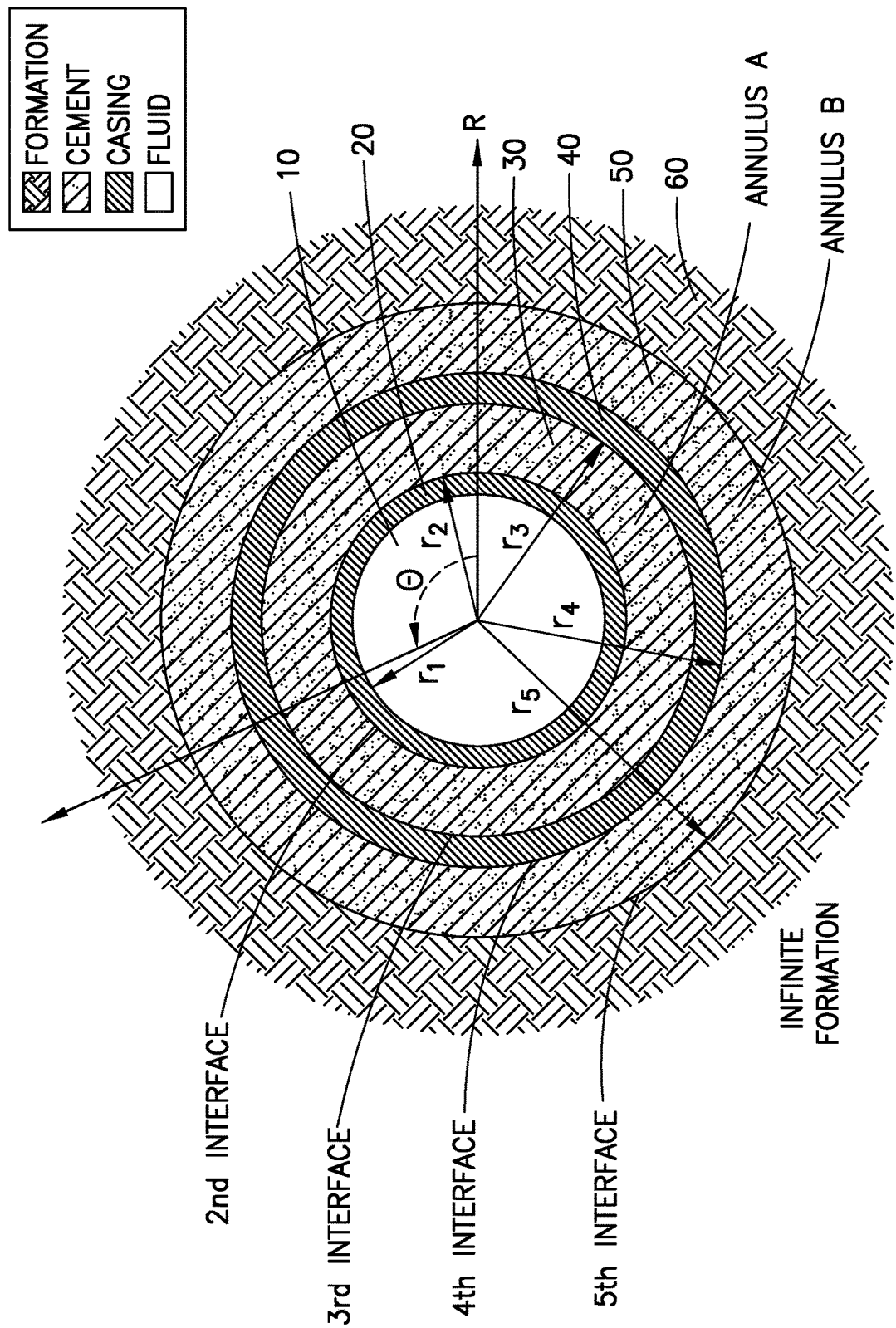
FIG. 1 is a schematic diagram showing a cross-section of a fluid-filled well-bonded double-cased borehole.

FIG. 1 shows the cross-section of a well bonded, double-cased borehole and a coordinate system. The cylinders from the center to the outside of the cross-section are the fluid column 10, inner casing 20, cement annulus A 30, outer casing 40, cement annulus B 50, and infinite formation media 60, respectively. The material properties and geometry parameters (including radii r, shear and compressional velocities $V_s$ and $V_p$, and densities $\rho$ for the modeling are provided in Table I.

TABLE I

Material properties and input parameters for modeling of cased borehole

| | Dimensions | | | | | Material properties | | |
|---|---|---|---|---|---|---|---|---|
| | $r_1$ (mm) | $r_2$ (mm) | $r_3$ (mm) | $r_4$ (mm) | $r_5$ (mm) | $\rho_i$ (kg/m$^3$) | $V_P$ (m/s) | $V_s$ (kg/m$^3$) |
| Fluid | 78.537 | 88.9 | 107.95 | 122.237 | 152.4 | 1000 | 1500.00 | 0 |
| Steel | | | | | | 7392 | 5959.09 | 3229.39 |
| Cement | | | | | | 1900 | 3625.00 | 2015.00 |
| Formation | | | | | | 2090 | 2634.00 | 1736.20 |

The bonds between the casings and cement annuli are denoted as the $2^{nd}$, $3^{rd}$, $4^{th}$, and $5^{th}$ interfaces, respectively. As will be discussed hereinafter, damaged borehole cases considered include the degradation of the cement annuli A and B, with one or more of these annuli being replaced by drilling/formation fluid or gas, and the weak bonding and debonding that could occur in the casing-cement interfaces or the cement-formation interface.

In modeling the described system, a modeled acoustic logging tool using a specified transmitter such as a monopole source using a chirp excitation sweep from 0 to 100 kHz (which is optionally conducted over several hundreds of microseconds) is considered concentrically placed inside a model borehole. Resulting waveforms are obtained with a specified receiver array where the axial array receivers are placed at the same radial position as the transmitter and mounted along different azimuthal positions. A transmitter to first receiver spacing is specified (e.g., one foot) as is a specified inter-receiver spacing (e.g., 1 inch). An array of a specified number of axial receivers (e.g., 100 receivers) are used to collect (synthetic) waveforms with an specified recording time (e.g., 6 milliseconds). A transient dynamic acoustic-solid interaction approach is applied for the modeling. The waveforms received by the receivers are stacked and processed with a modified matrix pencil method in order to generate slowness dispersions. See, e.g., Ekstrom, M. P., "Dispersion Estimation from Borehole Acoustic Arrays using a Modified Matrix Pencil Algorithm", $29^{th}$ Asilomar Conference on Signals, Systems and Computers (1995); Kimball, C. V., and Marzetta, T. L., "Semblance Processing of Borehole Acoustic Array Data", Geophysics, Vol. 49, No. 3, p. 274-281 (1986), and U.S. Pat. No. 4,594,691 to Kimball et al.

Figure 2:
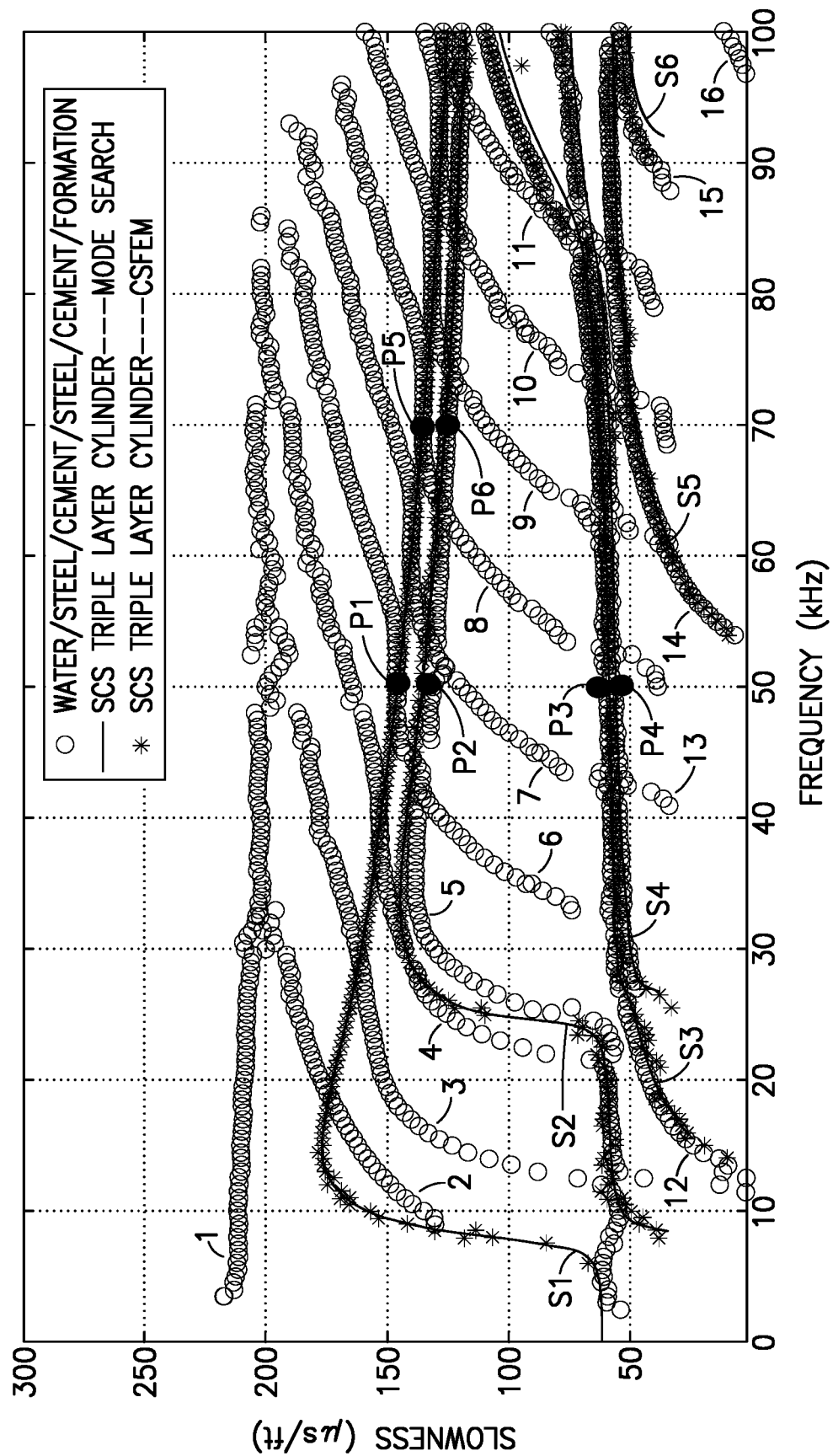
FIG. 2 is a diagram showing slowness dispersion curves in an intact double-cased hole with a well-cemented water-steel-cement-steel-cement-formation configuration. The lines and asterisks indicate the skeletal dispersion curves obtained respectively from mode search and synthetic modeling algorithms.

FIG. 2 shows the slowness dispersion curves for the intact double-cased wellbore shown in FIG. 1 with the water or mud filled borehole, an inner steel casing, a well-cemented first annulus, a second steel casing, a well-cemented second annulus, and then the formation (which is referred to herein as a W/S/C/S/C/F configuration). The "skeleton" or most solid portion of the cased wellbore of FIG. 1 is the SCS (steel-cement-steel) triple layer cylinder. Corresponding skeleton dispersion curves (in solid lines identified through a mode search, and in asterisks identified by a Chirp Sweeping Finite Element Modeling (CSFEM) algorithm—see, Liu, Y. et al., "Guided Waves in Fluid-Elastic Concentric and Non-Concentric Cylindrical Structures: Theoretical and Experimental Investigations", $43^{rd}$ Annual Review of Progress in Quantitative Nondestructive Evaluation (QNDE) (2016) are labeled S1-S6, while guided wave modalities indicated by labels 1-16 are also observed. Skeleton dispersion curves S1-S6 are seen to have their genesis at different frequencies, with S1 starting at about 0 kHz, S2 starting at about 9 kHz, S3 starting at about 12 kHz, S4 starting at about 26 kHz, S5 starting at about 60 kHz, and skeleton dispersion curve S6 starting slightly above 90 kHz.

According to one aspect, skeleton dispersion curves S1-S5 for a SCS skeleton may be well identified in the frequency range of 5 kHz-70 kHz. According to another aspect, skeleton dispersion curves S1-S6 for a SCS skeleton may be well identified in the frequency range of 5 kHz-100 kHz. It should be appreciated that the frequency range may change depending upon the diameters of the steel casings, with larger casings causing the frequencies to shift toward lower frequencies and with smaller casing causing the frequencies to shift toward higher frequencies.

Figure 3:
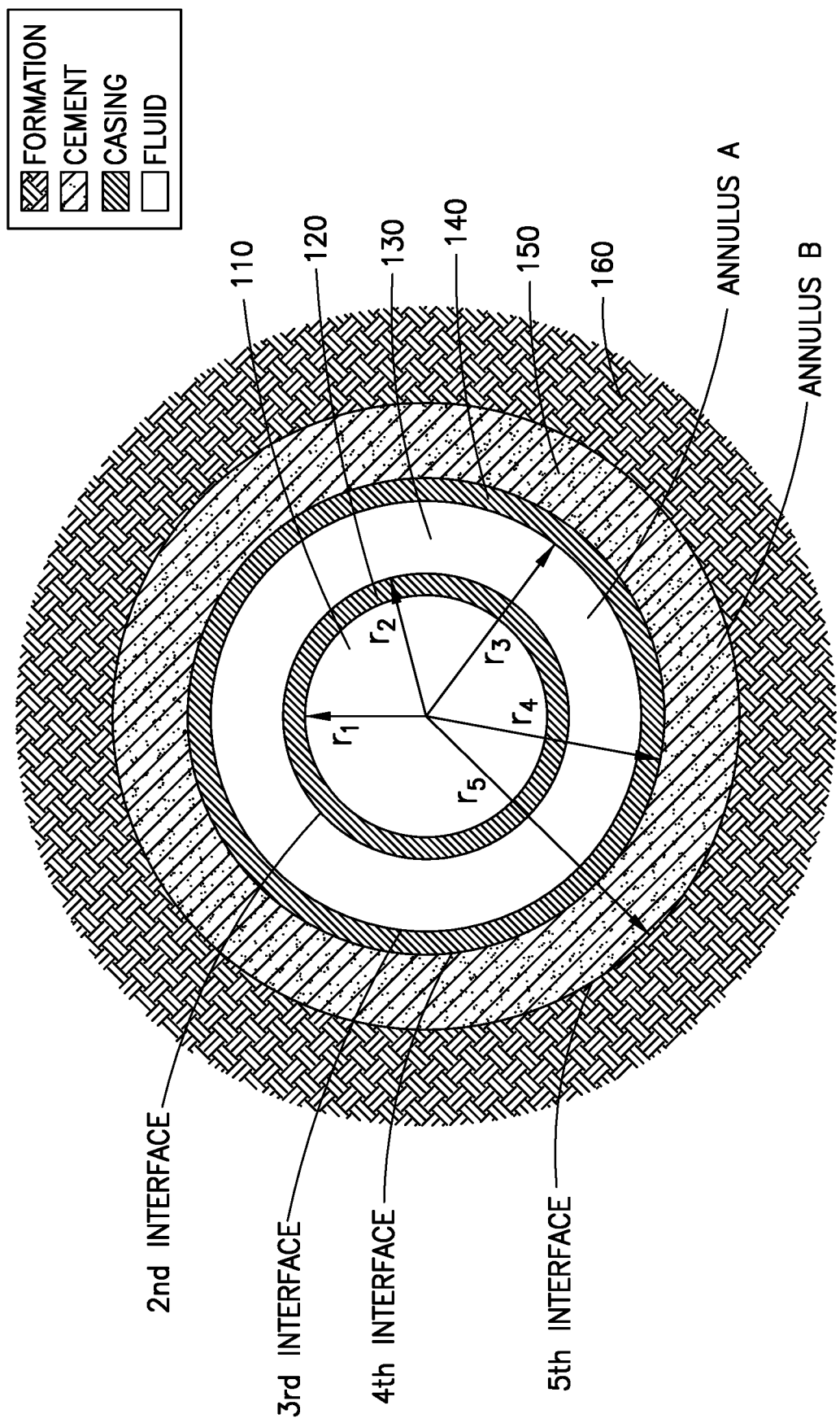
FIG. 3 is a schematic cross-sectional diagram of a double-cased hole with a water-steel-water-steel-cement-formation configuration.
Figure 4:
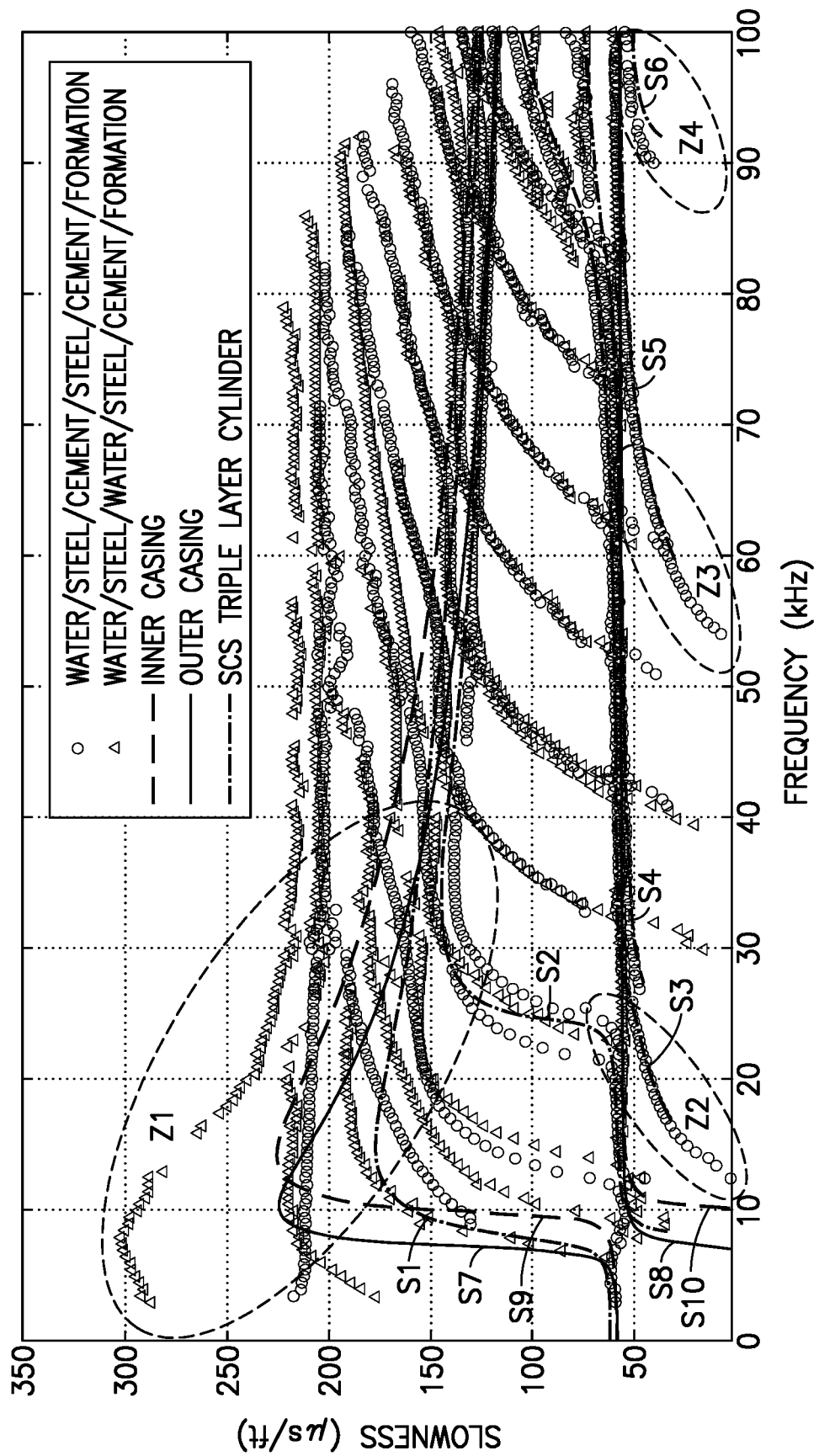
FIG. 4 is a diagram showing slowness dispersion curves in a double-cased hole of the configuration shown in FIG. 3, with the skeleton modes of the FIG. 3 configuration shown as dashed (dash-dot-dash) lines and the dispersion curves shown with triangles. These are overlaid with skeleton modes shown in solid lines and dispersion curves shown with circles for an intact double-cased hole.

Turning now to FIG. 3, a double-cased wellbore with water or mud 110, inner casing 120, water annulus A 130, outer casing 140, cement annulus B 150, and infinite formation media 160 (W/S/W/S/C/F configuration) is shown. FIG. 4 shows the CSFEM slowness dispersion curves (triangles) for a double-cased hole with W/S/W/S/C/F configuration and the associated skeletal modes. The dispersion curves of an intact double-cased hole (W/S/C/S/C/F) is also shown (circles) in FIG. 4 as a baseline. It is observed that the skeleton of the geometry transforms from a SCS triple layer cylinder to just separate inner and outer casings due to the presence of the water annulus 130. In FIG. 4, the skeleton modes for the intact wellbore are labeled as S1 to S6 (shown as dash-dot-dash lines), while those for the damaged wellbore are labeled as S7 to S10 (S7 and S8 for the inner casing, and S9 and S10 for the outer casing).

Figure 5:
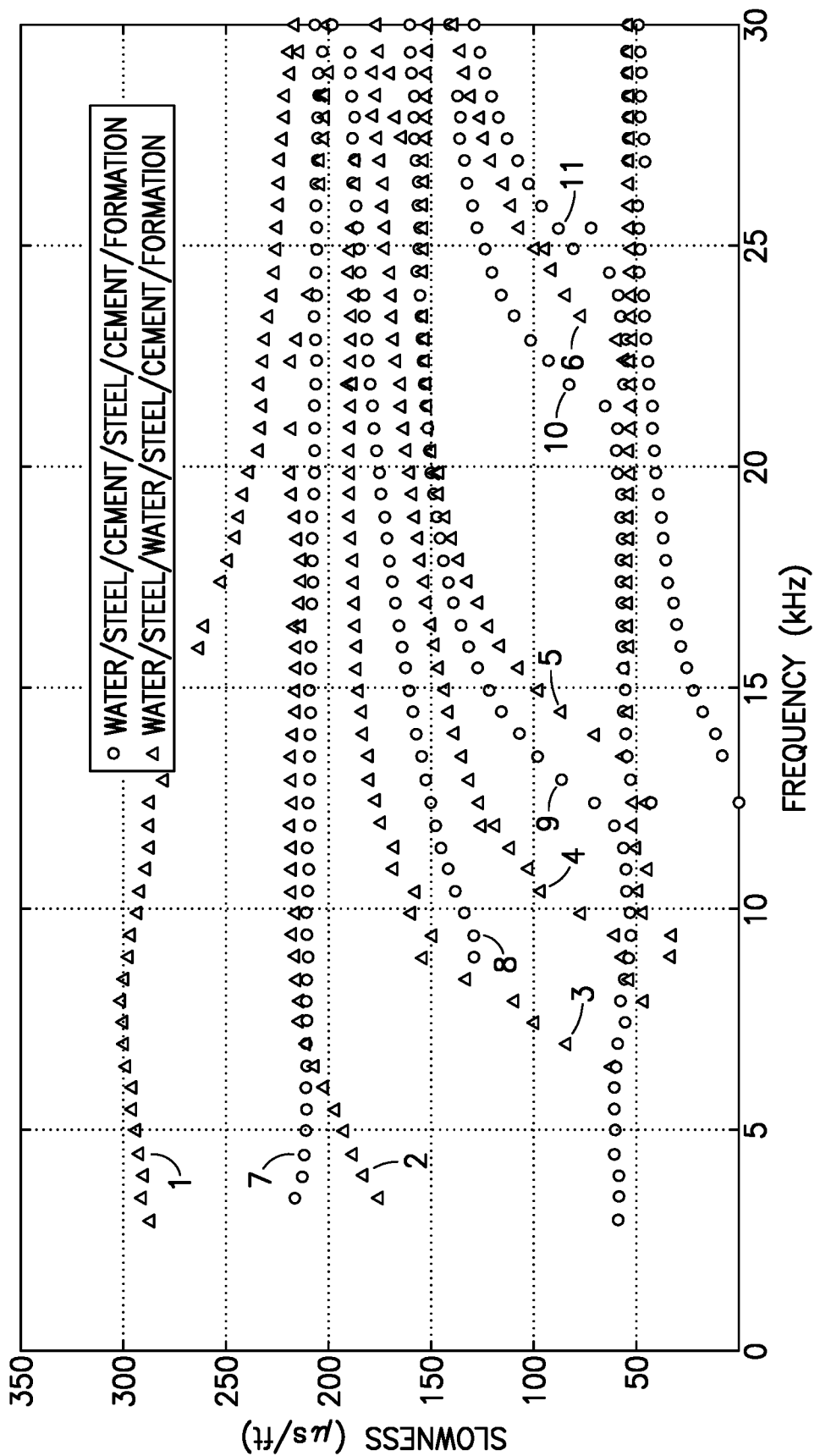
FIG. 5 is a magnified view of the slowness dispersion curves in zone 1 (Z1) of FIG. 4.

Additional casing-fluid interaction modes exist in a W/S/W/S/C/F configuration when compared with that of an intact double-cased hole, as respectively, denoted by the circles and dots in FIG. 4. The extra casing-fluid interaction modes are due to the additional solid-fluid interfaces introduced by the presence of water in annulus A 130. A magnified view of an identified region of FIG. 3 (Z1 region) indicates that the slowness of a W/S/W/S/C/F configuration (labeled as "1" to "6" in FIG. 5) increases compared with these of an intact wellbore (label as "7" to "11" in FIG. 5). The slowness increments are due to the softening effect of the whole geometry when cement is replaced by fluid in annulus A. The skeletal transformation renders structural changes in dispersion curves, which includes modal branches S3, S4, S5, and S6 which are present in the well-cemented configuration of FIG. 1 being absent in the W/S/W/S/C/F configuration of FIG. 3. Hence, these features can be used to characterize cement annulus A.

Thus, according to one aspect, the presence of low-slowness branches S3, S5, and S6 (which may also be referred to as the SCS triple layer cylinder cut-off modes) indicates that the inner annulus is cemented. As will be discussed hereinafter, this remains true when the outer annulus B is filled with lightweight cement or fluid. In case annulus B is filled with very stiff cement (such that there is an extremely large stiffness contrast between the cement and the formation), the skeleton may be effectively transformed into a SCSC four layer cylinder which could change the slowness skeletal branches as discussed hereinafter.

Figure 6:
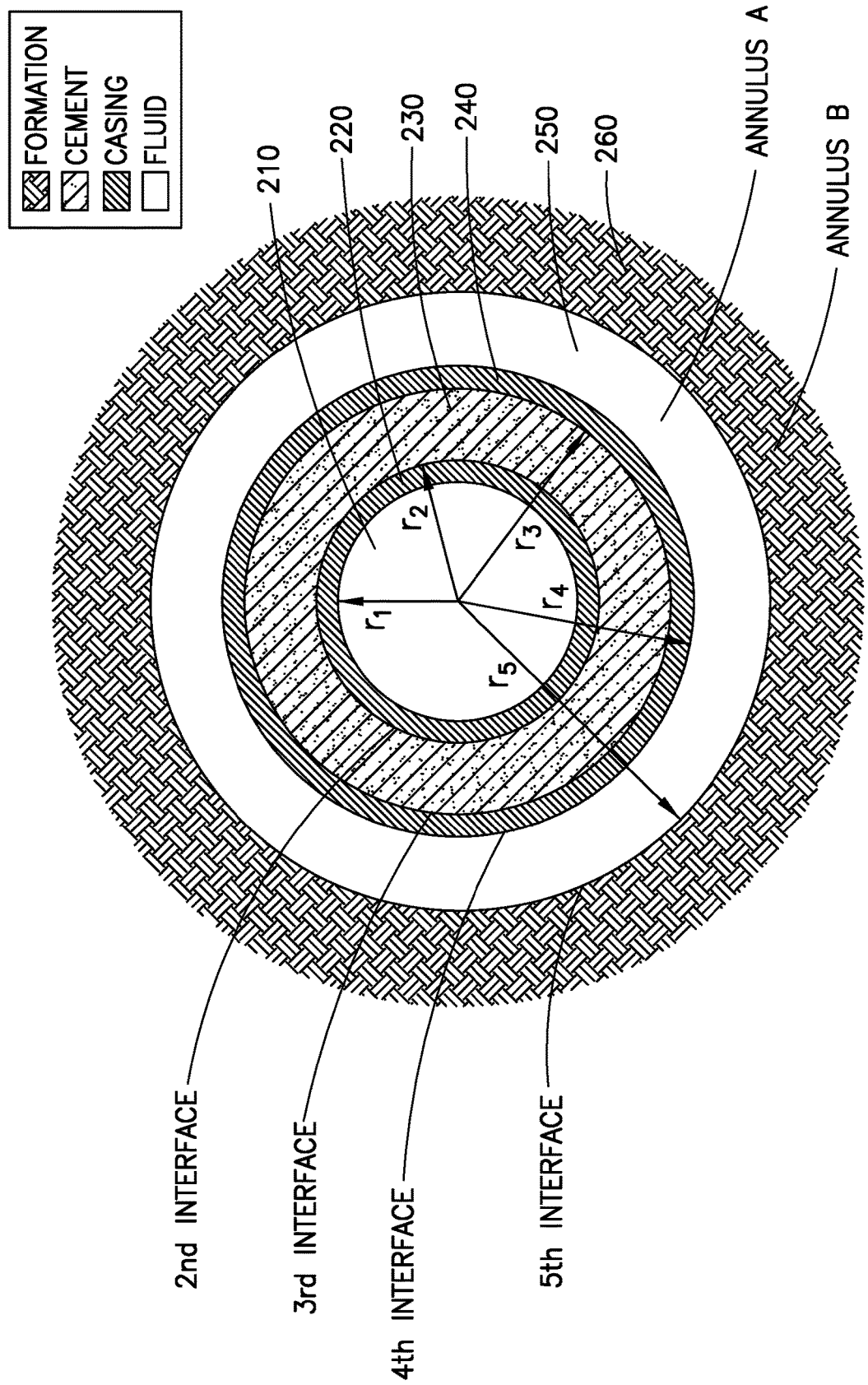
FIG. 6 is a schematic cross-section of a double-cased hole with a water-steel-cement-steel-water-formation configuration.
Figure 7:
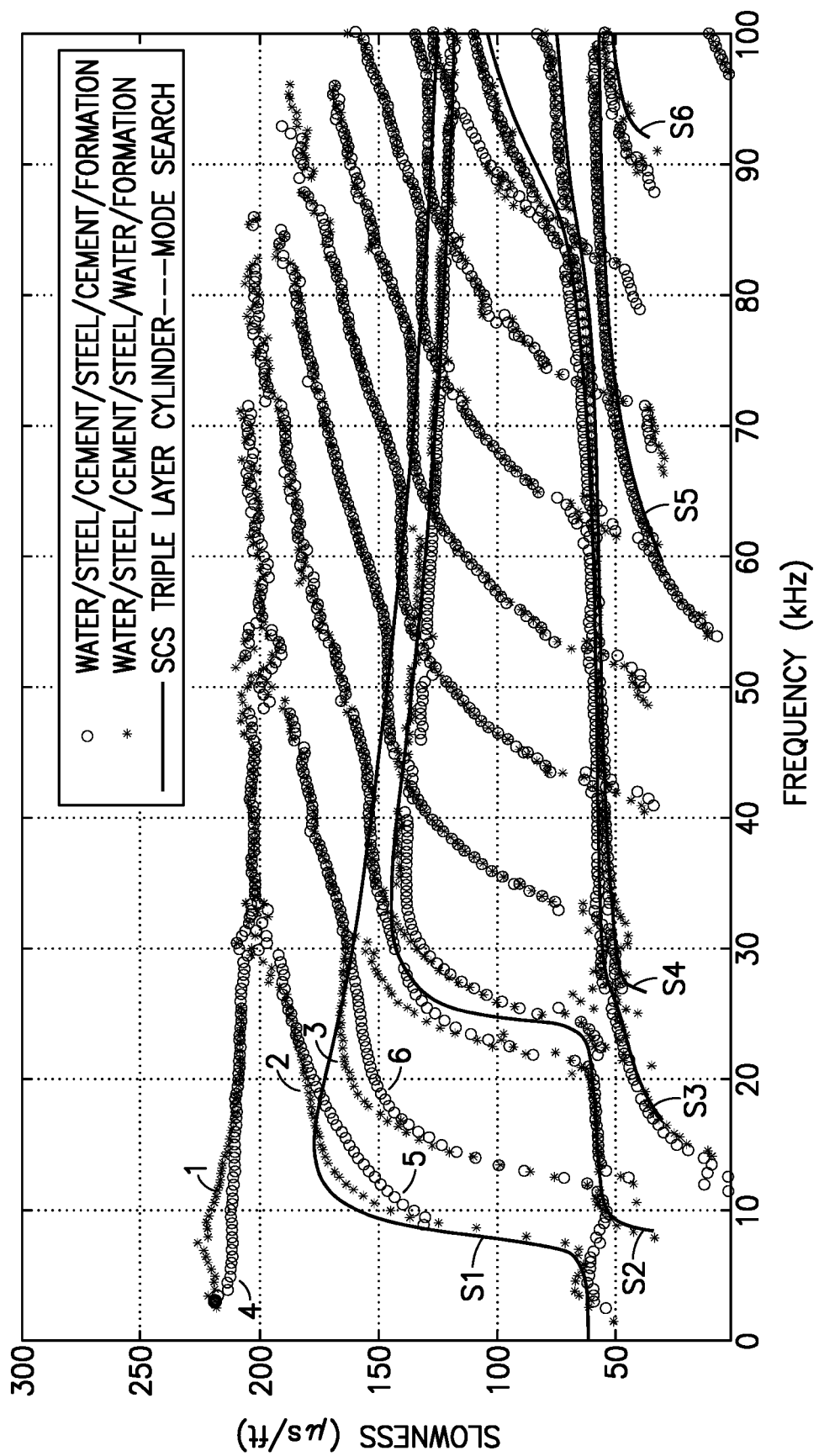
FIG. 7 is a diagram showing slowness dispersion curves in a double-cased hole with the configuration shown in FIG. 6 shown with asterisks and the dispersion curves of the intact double-cased borehole shown with circles. The skeleton modes are marked as solid lines.

FIG. 6 shows a double-cased wellbore with water or mud 210, inner casing 220, cement annulus A 230, outer casing 240, water annulus B 250, and infinite formation media 260 (W/S/C/S/W/F configuration). FIG. 7 shows the dispersion curves for the wellbore configuration of FIG. 6 as asterisks contrasted to the well-cemented W/S/C/S/C/F geometry of FIG. 1 in circles. The skeletal dispersion curves for this geometry appear to be the same as the skeleton of the intact wellbore and are labeled by S1 to S6 in FIG. 7. With the same skeleton, it should be appreciated that the differences between the two cases are localized at low frequency ranges around what may be referred to as the casing-fluid interaction modes. As can be seen in FIG. 7, the slowness dispersions of these modal branches (1 to 3 compared to 4 to 6) experience increments due to the softening effect arising from removing the cement in annulus B 250. There are barely any changes at high frequencies between the two cases.

Thus, according to one aspect, when an S/C/S skeleton is present, the additional presence at low frequencies of increases in the slownesses associated with the casing-fluid interaction modes (relative to the slownesses for the well-cemented arrangement of FIG. 1) indicates that the inner annulus is cemented and the outer annulus is fluid-filled.

Figure 8:
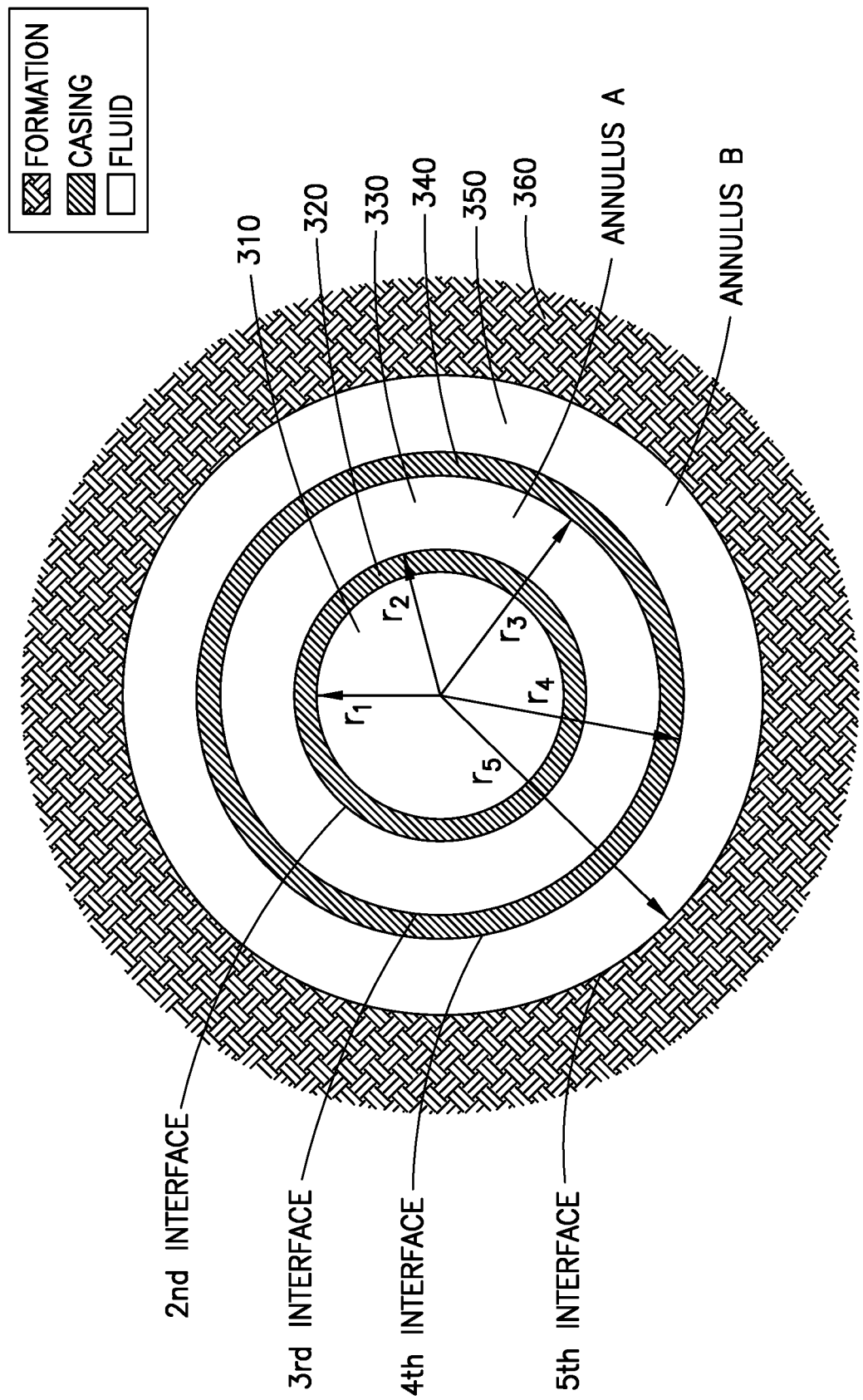
FIG. 8 is a schematic cross-section of a double-cased hole with a water-steel-water-steel-water-formation configuration.
Figure 9:
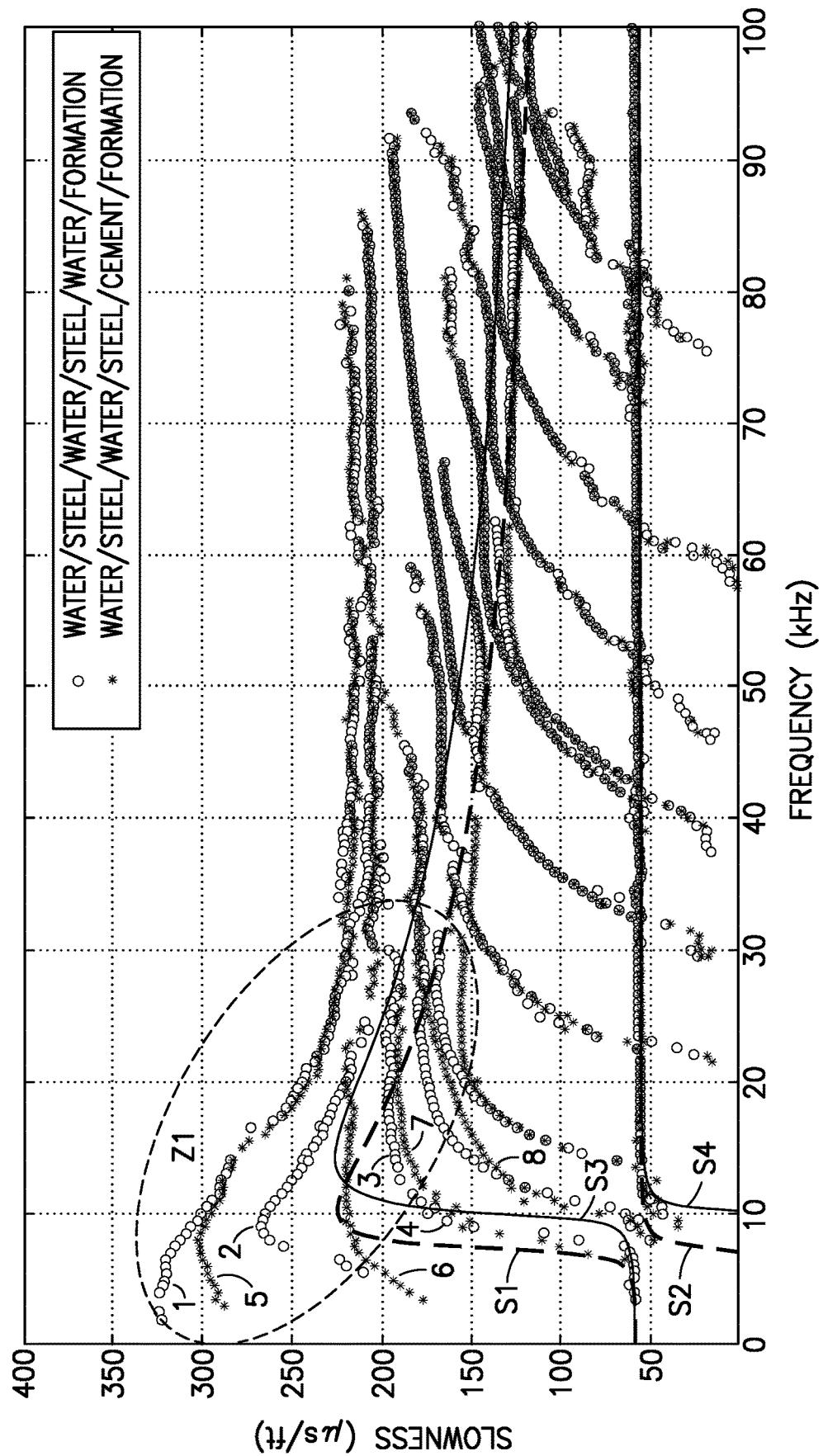
FIG. 9 is a diagram showing slowness dispersion curves in a double-cased hole with the configuration of FIG. 8 shown with dots and the dispersion curves of the double-cased borehole of FIG. 3 shown with circles. The skeleton modes are marked as solid lines.

FIG. 8 presents a double-cased wellbore with water or mud 310, inner casing 320, water annulus A 330, outer casing 340, water annulus B 350, and infinite formation media 360 (W/S/W/S/W/F configuration). The skeleton of the W/S/W/S/W/F configuration is the same as that of a W/S/W/S/C/F double-cased wellbore (FIG. 3); i.e., with separate inner and outer casings. The resulting skeletal modes are labeled as S1 to S4 in FIG. 9. In addition, the slowness dispersions for the W/S/W/S/W/F double-cased hole are similar to these of a W/S/W/S/C/F configuration, except for the low frequency casing-fluid interaction regions which are changed due to the stiffness variations. This is seen by the slowness dispersion curves shown in FIG. 9, while the dots and circles denote the modalities of W/S/W/S/W/F and W/S/W/S/C/F configurations, respectively. The skeletal and fluid resonant modes are identical for the two configurations, while the casing-fluid interaction modes for the W/S/W/S/W/F configuration (labeled as 1 to 4) exhibits higher slownesses compared with these of an intact wellbore (labeled as 5 to 8) due to the softening effect of the water in annulus B.

Thus, according to one aspect, with both annuli being fluid-filled, not only are the casing cut-off modes associated with the S/C/S skeleton missing, but there is an increase in the slowness associated with the casing-fluid interaction modes present at low frequencies (relative to a well-cemented second annulus).

Figure 10:
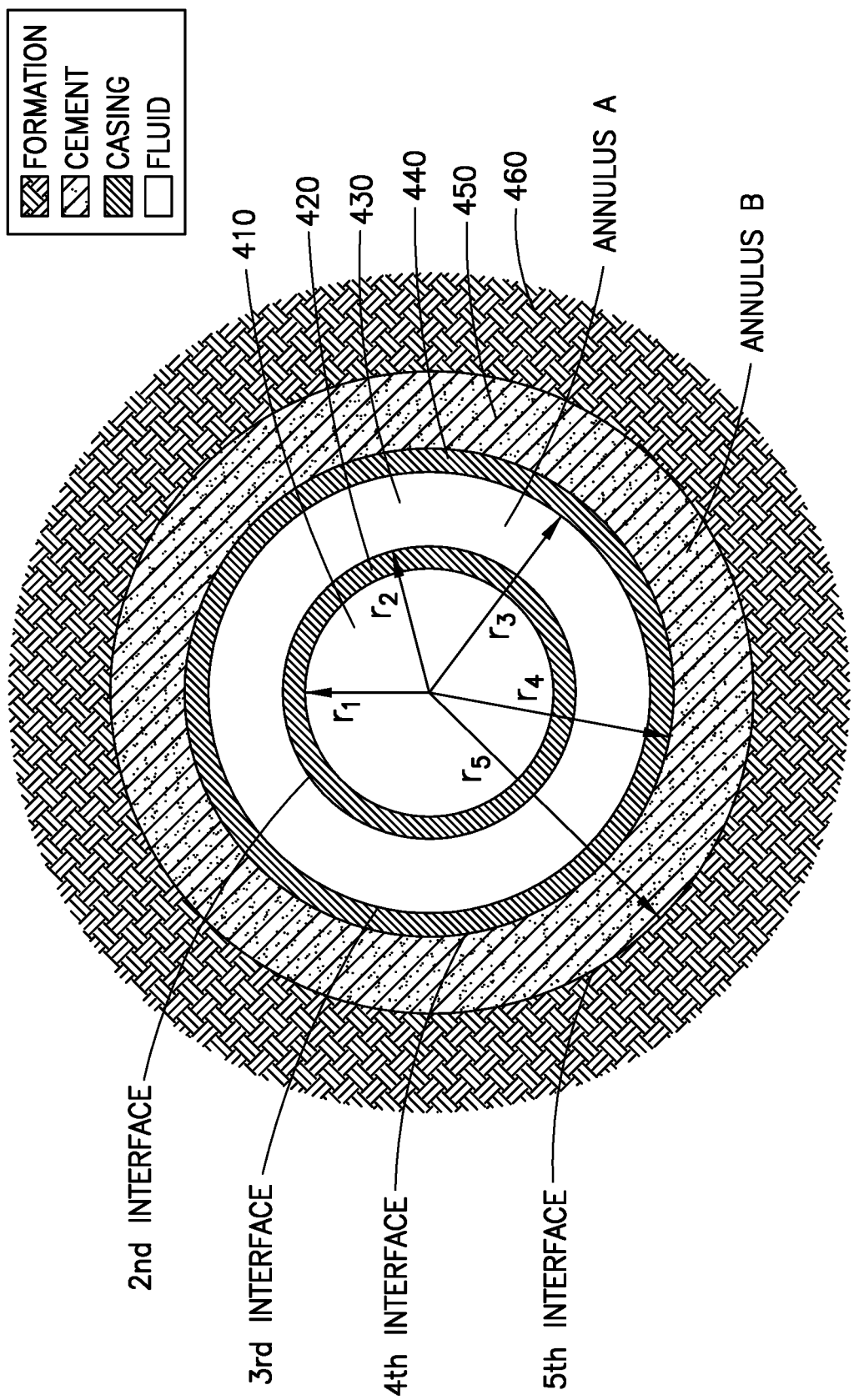
FIG. 10 is a schematic cross-section of a double-cased hole with a water-steel-water-steel-degraded cement-formation configuration.

Besides the possibility of having water or mud in one or both annuli of the double-cased wellbore, it is possible that one or both of the annuli may have degraded cement (dC) which can occur when one or both of the annuli are filled with fluid mixed with cement. The effective mechanical properties of the degraded cement are between a healthy cement and a fluid. FIG. 10 presents a double-cased wellbore with water or mud 410, inner casing 420, water annulus A 430, outer casing 440, degraded cement annulus B 450, and an infinite formation media 460 (W/S/W/S/dC/F configuration).

Figure 11:
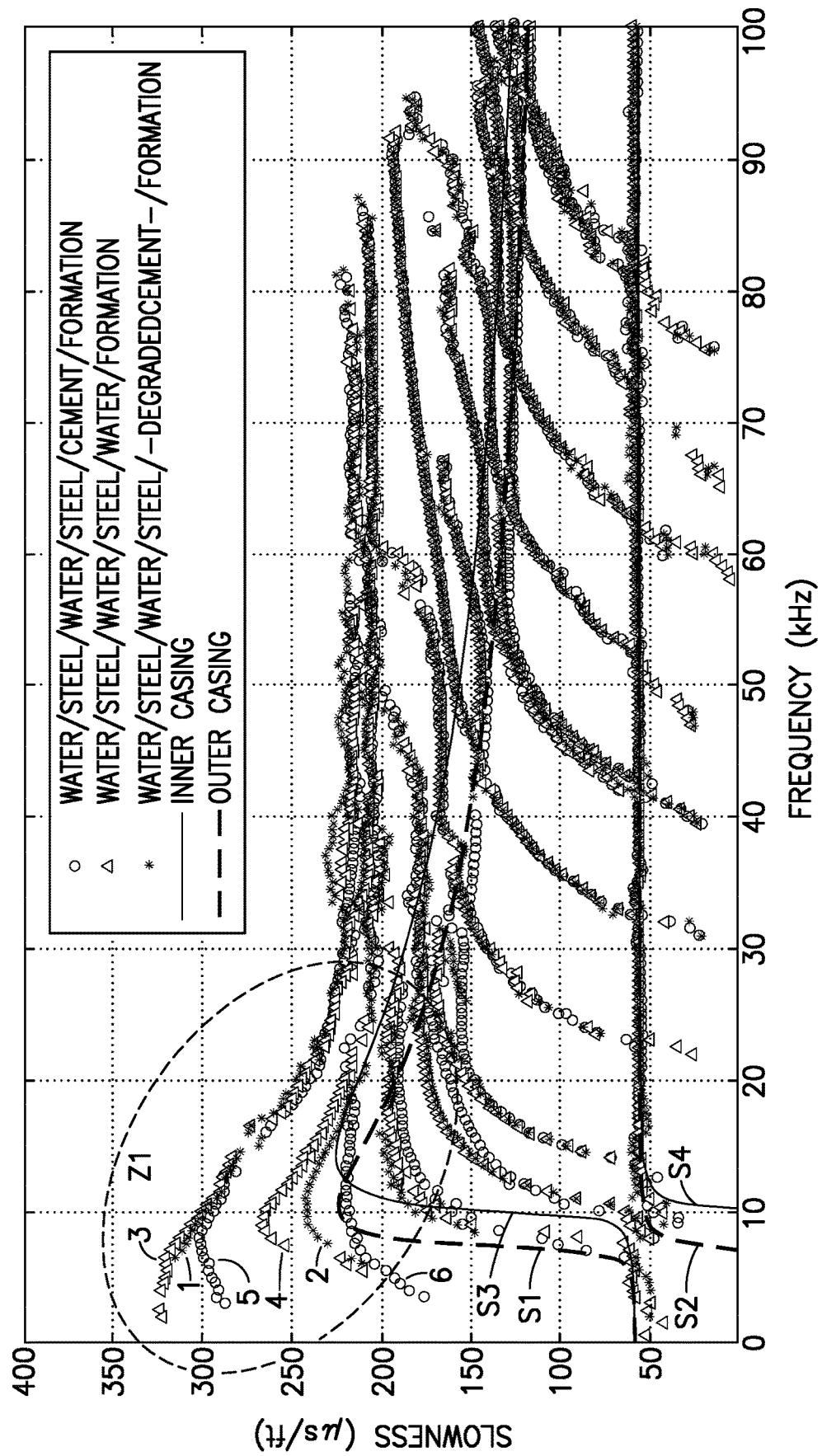
FIG. 11 is a diagram showing slowness dispersion curves in a double-cased hole with the configuration of FIG. 10 shown with + signs, the dispersion curves for the configuration of FIG. 8 shown with triangles and the dispersion curves for the configuration of FIG. 3 shown with circles. The skeleton modes are marked as solid and dashed (dash-dot-dash) lines.

The slowness dispersion curves for the W/S/W/S/dC/F configuration are shown in FIG. 11, where plus signs (+) denote the modal curves of the wellbore with the W/S/W/S/dC/F configuration and where the circles and triangles, respectively, indicate the slowness dispersion curves of the W/S/W/S/W/F and W/S/W/S/C/F configurations for comparison purposes. These three configurations contain the same skeleton; separate inner and outer casings, whose modal dispersions are labeled as S1 to S4 with the inner casing model dispersion shown as a solid line and the outer casing modal dispersion shown as a dash-dot-dash line. Therefore, the visible dispersion variations for the three configurations occur at the lower frequency casing-fluid interaction regions as indicated by Z1 in FIG. 11; particularly between 0 and 30 kHz, and even more particularly between about 4 or 5 kHz and 20 kHz. It is observed that in this region, the W/S/W/S/dC/F configuration (labeled 1 and 2) exhibits higher slowness than that of the W/S/W/S/C/F wellbore (labeled 5 and 6), which is physically reasonable as the presence of degraded cement annulus softens the geometry as a whole. Similarly, the degraded geometry is stiffer than a W/S/W/S/W/F configuration. Therefore, the slowness dispersions of the degraded wellbore present between those of the W/S/W/S/W/F (labeled 3 and 4) and W/S/W/S/C/F (labeled 5 and 6) configurations, as shown in FIG. 11.

Thus, according to one aspect, with annulus A fluid-filled, the casing-fluid interaction modes occurring at the low frequency range (e.g., below 20 kHz) provide signatures to identify the state of annulus B. Their slowness increases as the content of annulus B softens from a solid cement to water. This suggest a model-based workflow to quantify the slowness change associated with the softening of the content of annulus B.

Figure 12:
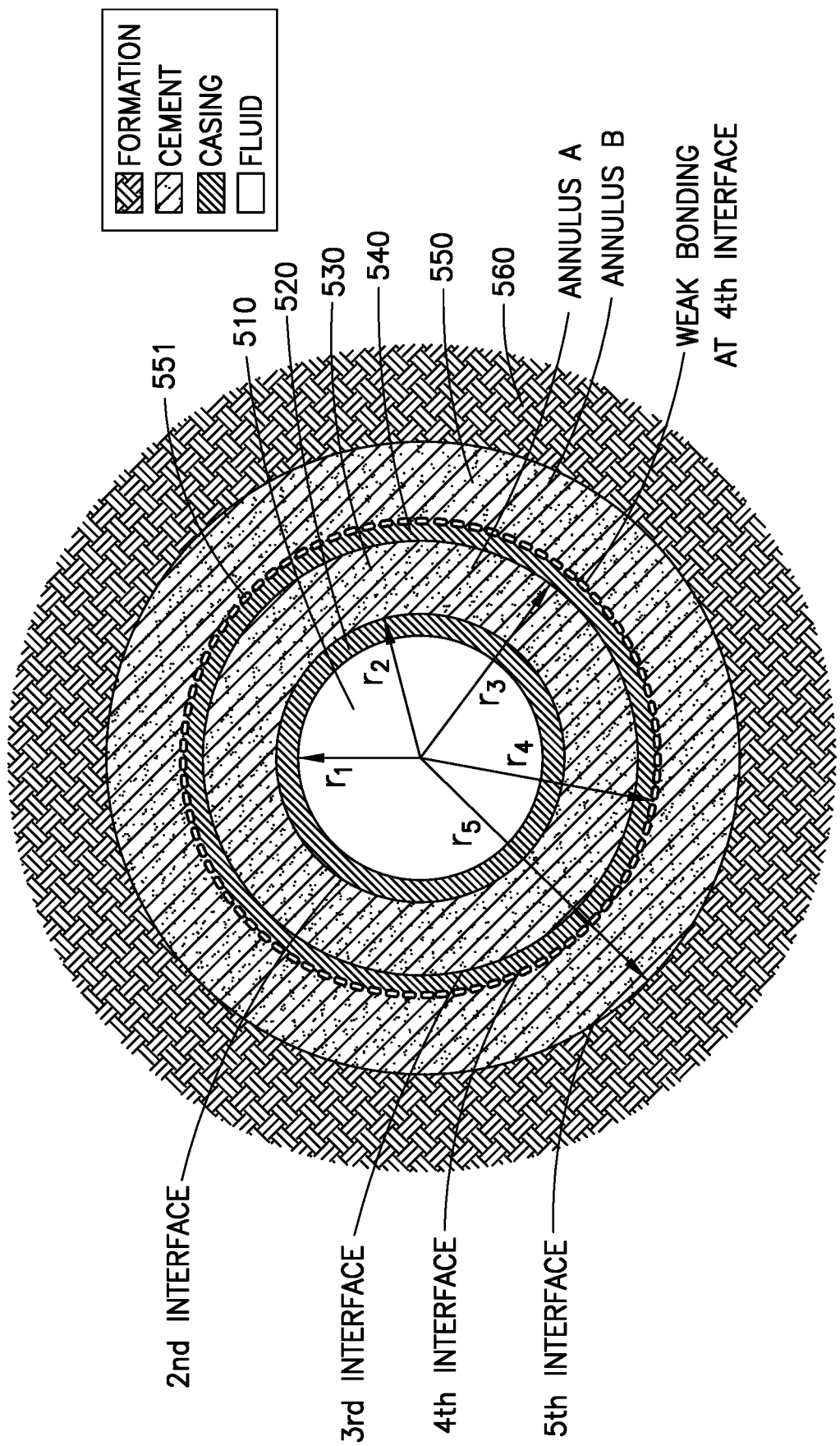
FIG. 12 is a schematic cross-section of a double-cased hole with $4^{th}$ interface debonding.

Turning now to FIG. 12, a double-cased wellbore is seen with water or mud 510 inside the inner casing 520, cement annulus A 530 between the inner casing and the outer casing 540, a cement annulus B 550 adjacent to but having a weak bond at the interface 551 with the outer casing 540, and an infinite formation media 560 (W/S/C/S/b4C/F configuration). In some terminology, it is said that there is a "slip" at the $4^{th}$ interface between outer casing 540 and cement annulus 550. In modeling the wellbore of FIG. 12, a weak bonding and debonding conditions are generated by assuming zero spring constants at the $4^{th}$ interface.

Figure 13:
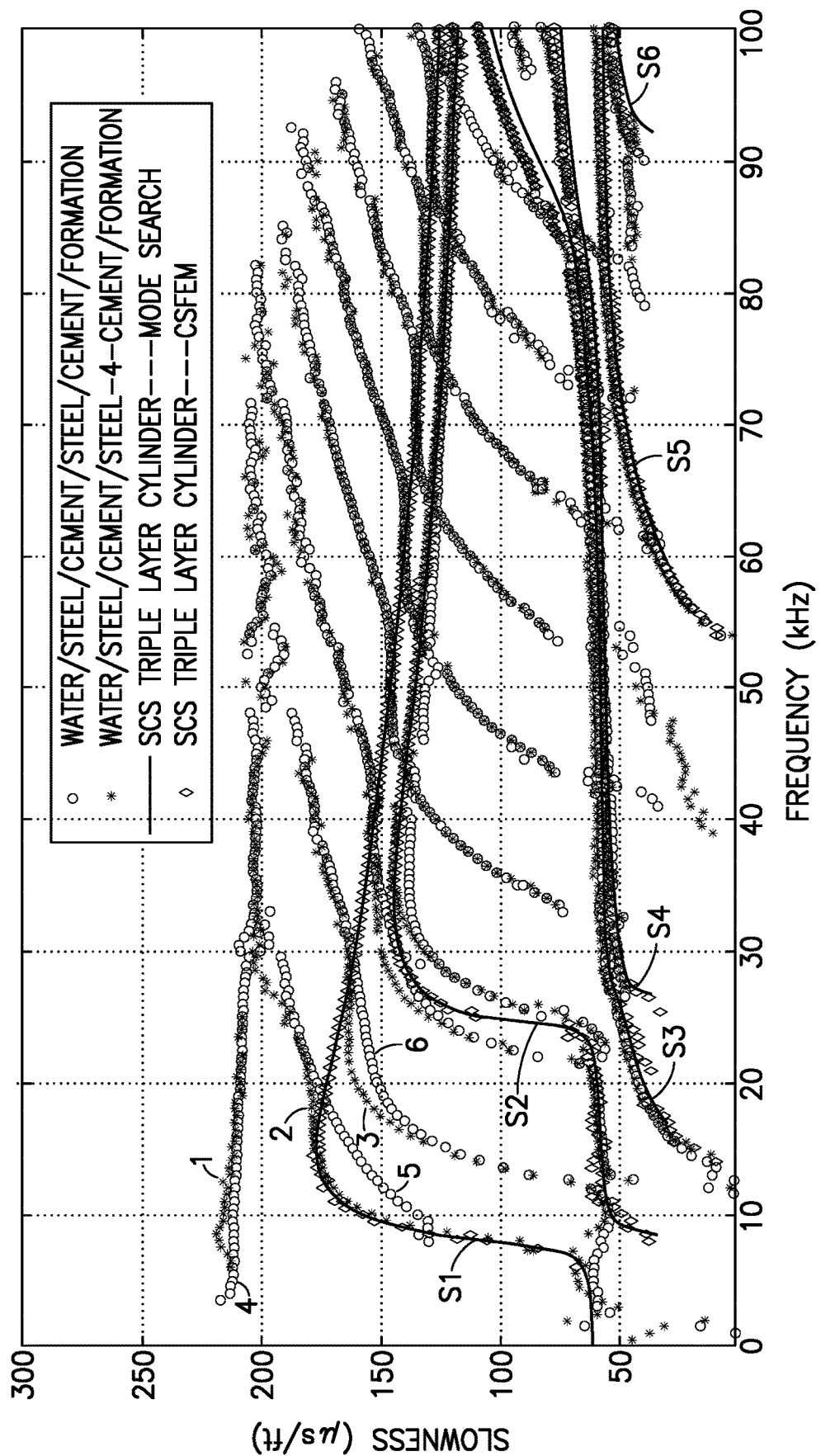
FIG. 13 is a diagram showing slowness dispersion curves in a double-cased wellbore with $4^{th}$ interface debonding shown with diamonds and the dispersion curves of an intact double-cased borehole shown with dots. The skeleton modes are marked as lines and with x's.

FIG. 13 shows the slowness dispersion curves for the W/S/C/S/b4C/F configuration of FIG. 12. The dispersion curves for an intact double-cased hole (as shown in FIG. 2) are also presented in the figure as a solid line for the mode search and as x's for the CSFEM as a baseline. The curves for the intact and the $4^{th}$ interfacial debonded wellbores are indicated by dots and diamonds, respectively. It is observed that the $4^{th}$ interfacial debonded double-cased hole of FIG. 12 shares the same skeleton (SCS) and hence the same skeletal modes with the intact wellbore which are labeled by S1 to S6. The invariance of skeletal modes indicates that no structural change should occur in the wellbore dispersitivity.

On the other hand, it is observed that the lower frequency casing-fluid interaction modes (between about 5 kHz and 30 kHz) of the W/S/C/S/b4C/F configuration (labeled 1 to 3) exhibit mild increments in slowness dispersions relative to their counterparts of the W/S/C/S/C/F configuration (labeled by 4 to 6), which is due to the mechanical softening by the debonding. In addition, certain casing cut-off modes (seen starting at 40 kHz, 60 kHz, and 67 kHz respectively) appear to be stronger than corresponding cut-off modes of the W/S/C/S/C/F configuration.

Thus, according to one aspect, with both annuli cemented, but with a slip/debond at the $4^{th}$ interface, there is sensitivity exhibited in the mild increase in slowness dispersion of the casing-fluid interaction modes at lower frequencies, and an increase in the strength of the casing cut-off modes at higher frequencies.

Figure 14:
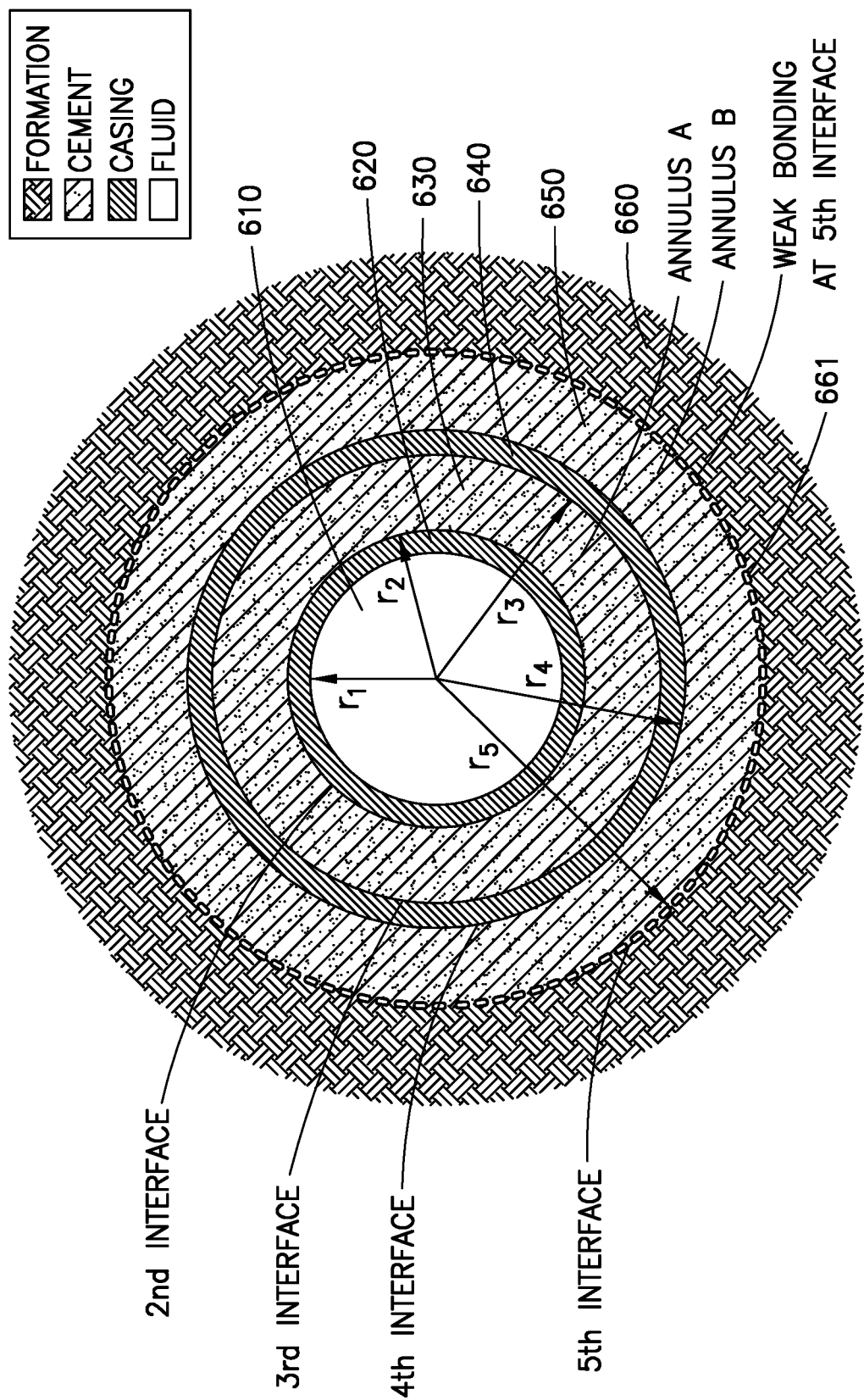
FIG. 14 is a schematic cross-section of a double-cased hole with $5^{th}$ interface debonding.

FIG. 14 illustrates a double-cased wellbore with water or mud 610 inside the inner casing 620, a cement annulus A 630 between the inner casing and the outer casing 640, a cement annulus B 650 between the outer casing 640 and an infinite formation media 660, with a weak bond at the ($5^{th}$) interface 661 of the cement 650 and the formation 660 (W/S/C/S/Cb5/F configuration).

Figure 15:
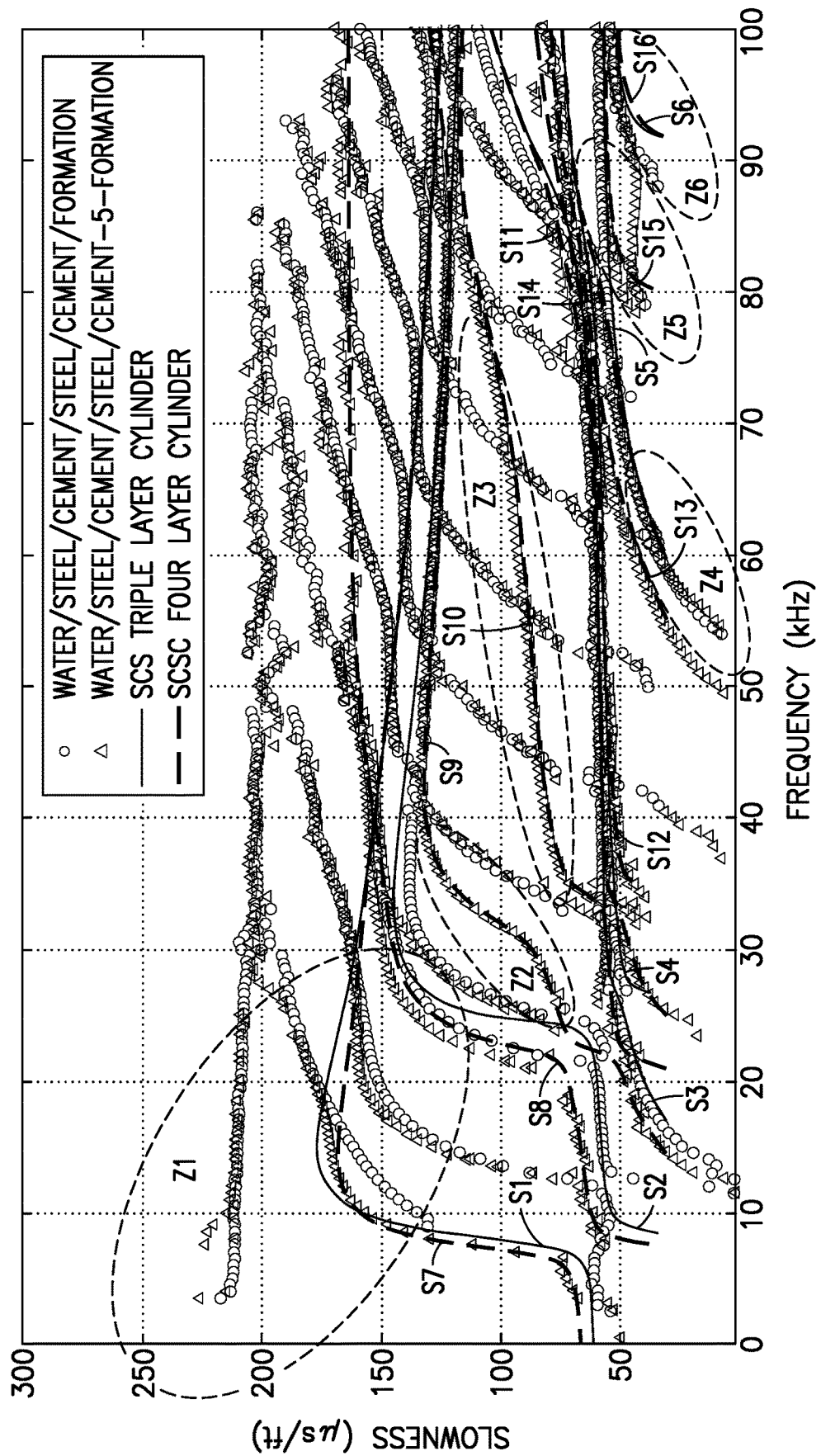
FIG. 15 is a diagram showing slowness dispersion curves in a double-cased wellbore with $5^{th}$ interface debonding shown with triangles and the skeleton modes for the FIG. 14 configuration shown in dashed (dash-dot-dash) lines. These are overlaid with skeleton modes shown in solid lines and dispersion curves shown with dots for an intact double-cased hole.

FIG. 15 shows the slowness dispersion curves for the W/S/C/S/b4C/F configuration of FIG. 14 with the triangles indicating the dispersion curves of a double-cased hole with $5^{th}$ interface debonding, and the dots denoting those of an intact wellbore as in FIG. 1. A skeletal transformation is observed when considering the geometrical changes from a SCS triple layer cylinder (with skeletal modes shown as curves labeled by S1 to S6) to a SCSC four layer cylinder (with skeletal modes shown as dash-dot-dash curves labeled by S7 to S16) caused by the $5^{th}$ interface debonding. The skeletal transformation induces a structural change in borehole guided characteristics, where feature branches (such as S9, S10, S13, and S15) not found for the SCS triple layer cylinder are presented as indicated by regions Z2 to Z5 in FIG. 15. In addition, at least one skeletal mode (S8) has a significantly increased slowness than its counterpart (S2) at higher frequencies (above 35 or 40 kHz). Further, since the stiffness of the geometry as a whole decreases with the presence of $5^{th}$ interfacial debonding, it is expected that slowness increments will occur at lower frequency casing-fluid interaction modes (particularly between 5 kHz and 25 kHz). This prediction is validated by the slowness variations as observed in Z1 in FIG. 15.

Thus, according to one aspect, with the cement annuli well bonded to the inner casing, but with the outer cement annulis presenting of a slip/debond at the $5^{th}$ interface (between annulus B and the formation) extra skeletal modes (e.g., S9, S10, S13 and S15) associated with a SCSC skeletal structure are found beyond those found with the SCS skeletal structure. In addition, a mild increase in slowness dispersion of the casing-fluid interaction modes at lower frequencies (below 30 kHz) occurs. Also, at least one skeletal mode (S8) has a significantly increased slowness than its counterpart (S2) at higher frequencies (above 35 or 40 kHz).

Figure 16:
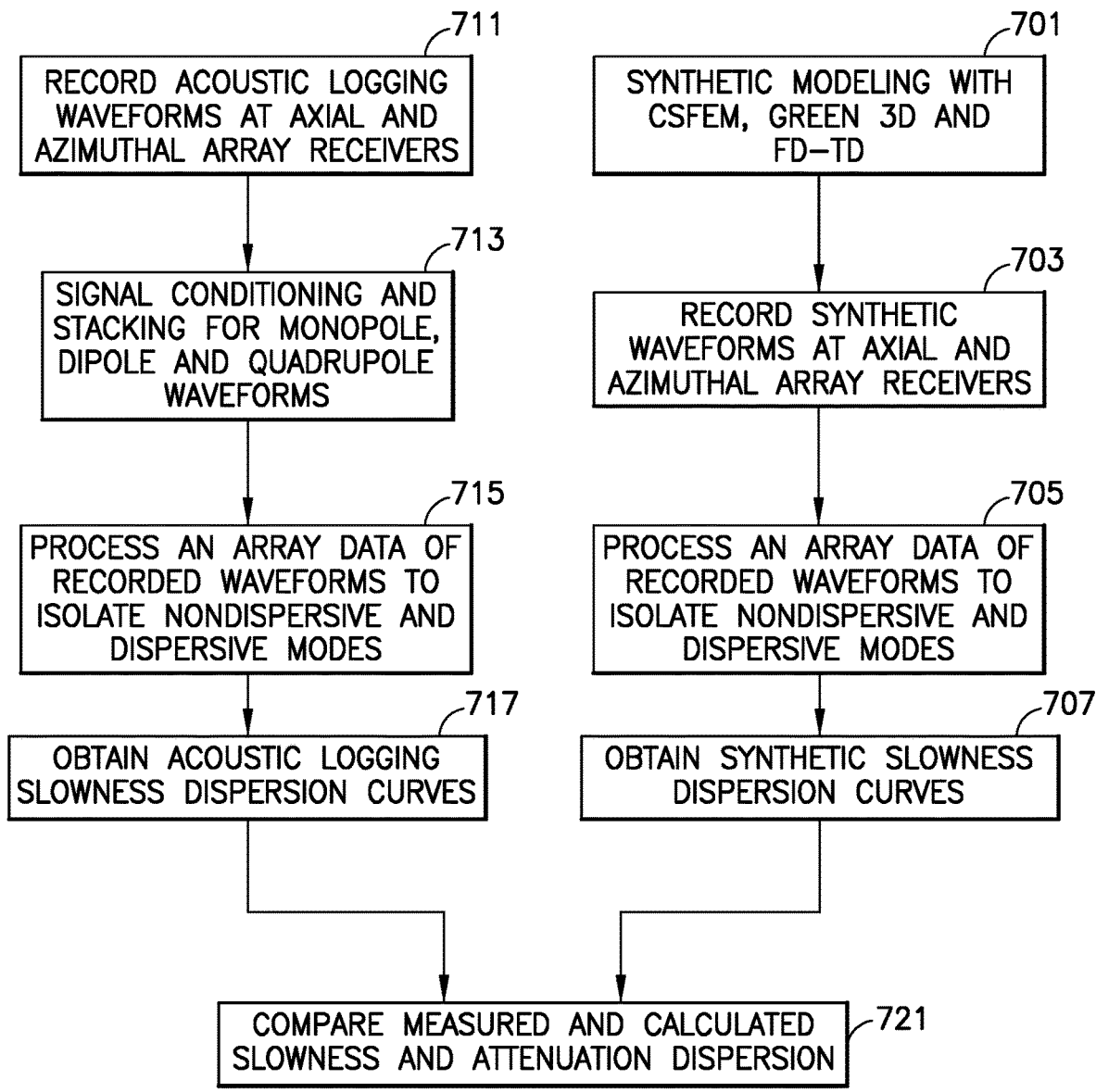
FIG. 16 is a flowchart of a method of wellbore damage characterization.

Based on the foregoing, methods are presented for characterizing multi-string cased wells using wide frequency bandwidth signals. In one embodiment shown in FIG. 16, at 701, at least one model is obtained for modeling acoustic tools in a geological formation. The model may be a synthetic model such as CSFEM or finite difference time domain (FD-TD), and/or an analytical model. With the embodiment of FIG. 16 showing the use of a synthetic model, synthetic wideband waveforms generated by a wide bandwidth monopole, dipole or quadrupole source and detected by an axial array of receivers are recorded at 703. The recorded waveforms are processed at 705 using a modified matrix pencil method in order to generate at 707 synthetic slowness dispersion curves over the wideband. In one embodiment, steps 701-707 are conducted for the W/S/C/S/C/F configuration shown in FIG. 1 and the results are stored in electronic and/or hard copy format. In another embodiment, steps 701-707 are conducted for multiple configurations (e.g., FIGS. 1, 3, 6, 8, 10, 12 and 14) and the results for each configuration is stored in a desired format. In one embodiment, steps 701-707 are conducted for multiple dual string well geometries (e.g., different casing radii, different casing thicknesses, different annulus thicknesses, etc.) for the configuration shown in FIG. 1 or for multiple configurations and the results are stored in a desired format. In one embodiment, the slowness dispersion curves for each well geometry are separately kept together as a set.

At 711, wideband acoustic logging waveforms received at the receivers of a tool (modeled at 701) which was placed downhole in a double-cased wellbore are recorded. At 713, the recorded waveforms are conditioned and stacked, and at 715 the conditioned and stacked waveforms are processed to isolate nondispersive and dispersive modes. At 717, slowness dispersion curves are generated using the modified matrix pencil method.

At 721, the slowness dispersion curves generated at 717 from the data obtained from the borehole tool are compared to the synthetic slowness dispersion curves generated at 707. The comparison may be done utilizing a least squares fit or other comparison techniques and/or visually. In one aspect, skeletal modes are identified in order to determine whether the investigated double-cased wellbore has a S/C/S skeleton as in FIGS. 2, 7 and 13, or whether the skeleton of the double-cased wellbore has separated metal casings (e.g., S/W/S) as in FIGS. 4, 9, and 11. The skeletal modes may also be identified in order to determine whether the investigated double-cased wellbore has a S/C/S/C skeleton as in FIG. 15. In particular, if five (or six) skeletal modes are found at expected frequency ranges and slownesses, it may be concluded that the first and second anuli are well cemented. If more than six skeletal modes are found, it may be concluded that the first annulus is well cemented and the second annulus contains cement but has a weak bond or slip at the $5^{th}$ interface. If only four skeletal modes are found, it may be concluded that the first annulus contains liquid.

In addition to the skeletal mode identification, lower frequency (e.g., between about 0 kHz and 30 kHz, or a portion thereof) casing-fluid interaction modes may be identified and compared to one or more of the stored dispersion curve plots by steps 701-707. If, for a S/C/S skeleton, increases in the slownesses associated with the casing-fluid interaction modes are found (relative to the slownesses for the well-cemented arrangement of FIG. 1), it may be concluded that the inner annulus is cemented and the outer annulus is fluid-filled. Of course, if a reference dispersion curve plot for a W/S/C/S/W/F configuration is generated and generated, the comparison at 721 will show such a match. Similarly, for a skeleton with the metal casings separated by liquid, the slownesses of the casing-fluid interaction modes may be used to distinguish whether the outer annulus is cemented or not (see FIG. 9). Likewise, the slownesses of the casing-fluid interaction modes may be used to identify degraded cement in the second annulus (see FIG. 11) or to identify debonding at the $4^{th}$ interface (see FIG. 13).

It will be appreciated that the method of FIG. 16 may be conducted at multiple locations in the double-cased well. If the state of the well is uniform along its length, the results obtained by the tool will be relatively static. However, if the state of the well is not uniform along its length, the results obtained by the tool will change. Because the tool has detectors spaced along its length, without further information, it may be difficult to locate precisely the location of transition of the well state.

Figure 17B:
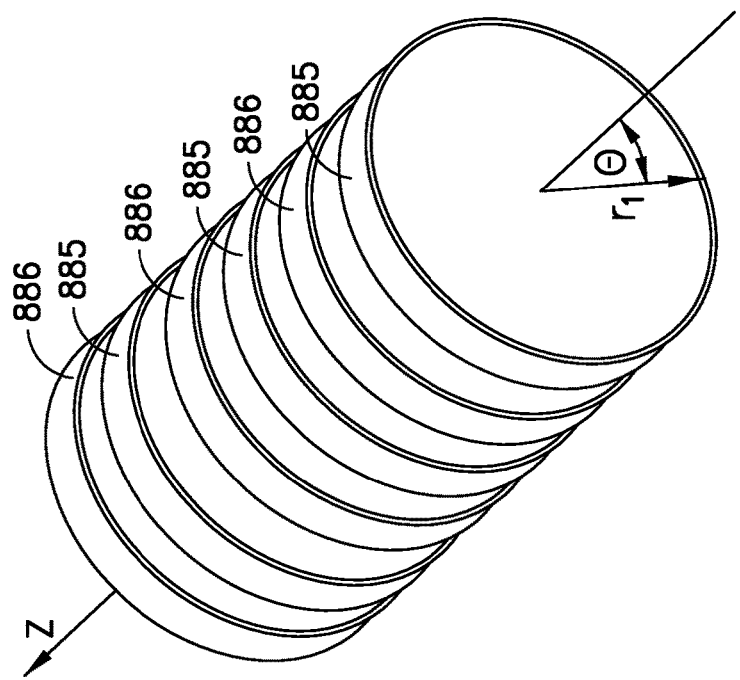
FIGS. 17a and 17b are respectively a cross-sectional diagram of a multi-element comb-like phased array transducer used to excite a selected wave mode in a borehole, and a schematic view of a pressure field resulting from the firing of the phased array transducer.

In accordance with another embodiment, additional apparatus and methods are provided for characterizing multi-string cased wells, where the characterization is both radial and axial. A transducer 800 useful for helping characterizing multi-string cased wells is seen in cross section in FIG. 17*a* and the pressure field generated by the transducer is seen in FIG. 17*b*.

Figure 17A:
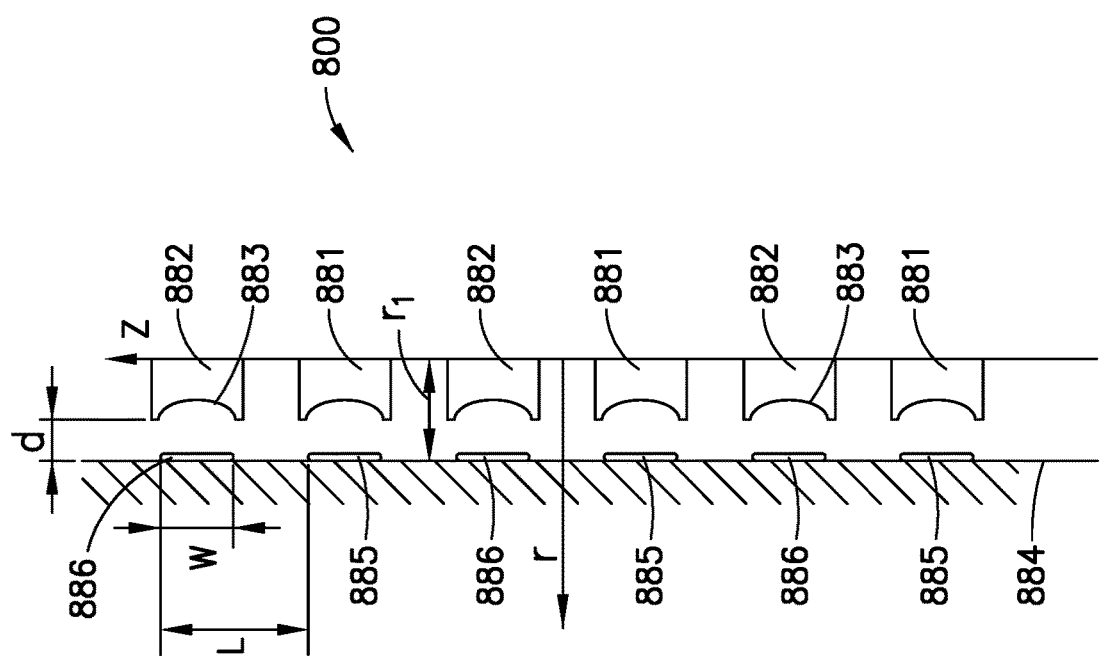

More particularly, a multi-element comb-like transducer 800 is designed for selective modal excitation in a cased-borehole geometry. The transducer has a series of circular transducer elements 881, 882, which in one embodiment are of different polarities. The transducer elements can be piezoelectric, magnetostrictive, or electromagnetic. As seen in FIG. 17*a*, the transducer 800 has a pitch denoted by L, and the transducer elements 881, 882 have concave faces 883 that have portions that are at a distance d from the casing wall 884. The transducer elements generate pressure fields 885, 886 (which in one embodiment are of different polarities) having a width w at the casing wall. As seen in FIG. 17*b*, the pressure fields 885, 886 are circular. For both phased and non-phased transducer array applications, the input signals to the transducer elements are narrowband toneburst signals of a certain frequency. A toneburst signal with more cycles results in a narrower band frequency spectrum which is advantageous in a selective guided wave actuation. For a single element transducer, mode control capability is generally not possible beyond the designed parameters, and all possible harmonic guided modes at that specific frequency will be generated. The amplitude of each harmonic mode can be represented as $$A_n(z) = F(\omega) \cdot d \; C_n(z), \tag{1}$$

where $F(\omega)$ is the frequency response of the single element, and $C_n(z)$ is the coupling coefficient between the surface loading function and the guided wave mode.

Based on the normal mode expansion method, $C_n(z)$ for a generated mode can be represented as an area integral $$C_n(z) = \frac{e^{-i\beta_n z}}{4P_{nn}} \int_{-L}^{L} e^{-i\beta_n \eta} \left( \int_{\partial D} v_n^* \cdot (t \cdot n_1) ds \right) d\eta, \tag{2}$$

where t is the exerted surface traction by a source loading function, $\partial D$ is the surface area that the source loading contacts with the waveguide, $\beta_n$ is the wavenumber of the harmonic mode n, and $v_n^*$ is the particle velocity distribution of the mode n. In addition, $n_1$ is the unit normal to the surface $\partial D$, and $P_m$ is the power density carried by the harmonic mode n.

If it is assumed that the length of the array element w is far less that the wavelength, the exponential term $e^{-\beta_n \eta}$ and the particle velocity $v_n^*$ will be approximately uniform within the integral area. Then, equation (2) can be recast as $$C_n(z) = S \cdot \frac{v_n^* \cdot t \cdot n_1}{4P_{nn}} e^{-i\beta_n(z-z_0)}, \tag{3}$$

where S is the area where the single element contacts the waveguide while $z_0$ is the element location.

It is assumed for a non-phased array transducer with N elements of distance D that all the element are of identical response, the amplitude of a harmonic mode $A_n(z)$ is given by $$A_n(z) = V \cdot F(\omega) \cdot C_n(z) \cdot H(\omega), \tag{4}$$

where $$H(\omega) = \sum_{i=1}^{N} e^{j[\omega t \pm \beta_n \cdot (z-z_i)]} = \frac{\sin\left(N \frac{L}{\lambda} \pi\right)}{\sin\left(\frac{L}{\lambda} \pi\right)} e^{j[\omega t \pm \beta_n \cdot (z-z_{center})]}, \tag{5}$$

and where ± indicates wave propagation in the −z and +z direction, respectively. L is the element spacing, λ is the wavelength of the harmonic mode n, and $z_{center}$ is the center location of the multi-element array. From equation (5), it is evident that the total frequency response of the array transducer is shaped by $H(\omega)$, which is a function of the element spacing L and wavelength λ. When L is equivalent to an integer multiple times of the wavelength, $H(\omega)$ will attain the maximum value that leads to a suppression of the modes that are of wavelengths other than λ. Equation (5) is the basis for phased or non-phased multi-element array transducer.

As previously discussed, the investigation of dispersion signatures enables the radial damage characterization of a double-cased hole; i.e., how the cementation or lack thereof diverges from the ideal. In particular, acoustic tools are implemented to extract dispersion curves which relate to the borehole geometry. These dispersion signatures are compared with the modeling results to identify the configuration and skeletons of the geometry. However, as set forth below, proper guided wave modes need to be selected and excited to accurately and precisely localize and characterize the damage axially. Thus, as set forth below, with the skeleton modes in hand, mode sensitivity and excitability study are conducted to select the waves that are sensitive to the targeting damage types. In this way, features such as reflection coefficients, attenuation, and harmonic generation can be utilized to accurately characterize and locate the damage to the cement annuli along the length of the cased hole.

Those skilled in the art are aware that when a borehole is being cased, a poor cement job can result in gaps or voids in annuli A or B that are not filled with cement slurry. After the cement curing process, formation fluid and drilling mud can migrate into these gaps. Resulting long term fluctuating stresses can cause the cement sheath to degrade and crack and be invaded with fluid after a long service time. Zonal isolation and well integrity become compromised with the presence of these axial fluid columns. Therefore, it is important to detect the location and length of these axial fluid columns. Detection involves the problem of locating the axial transition from cemented to uncemented annuli.

Figure 18:
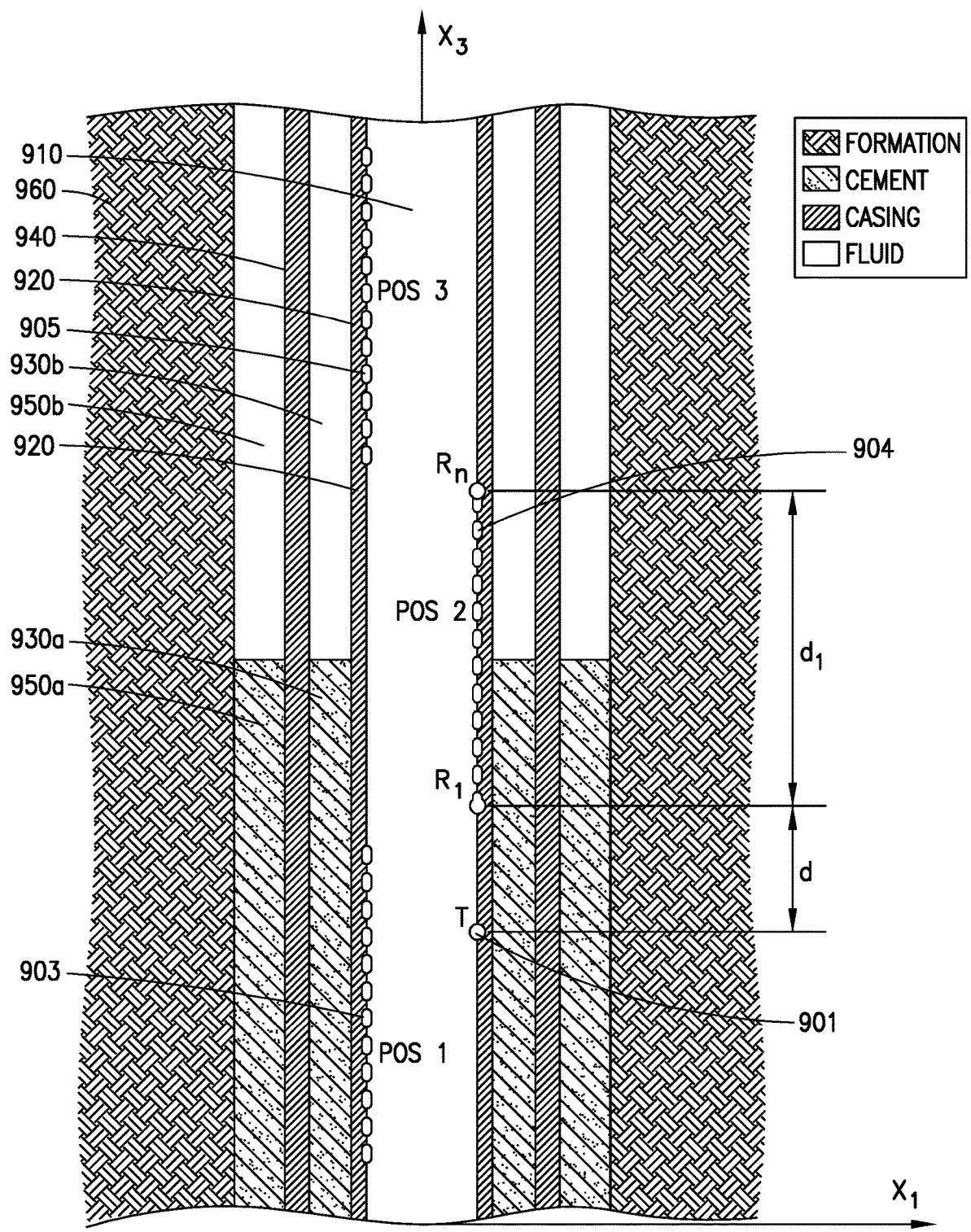
FIG. 18 is a schematic axial cross-sectional diagram of a double-cased hole with axial cement-fluid transition zone at annuli A and B.

In one aspect, it is useful to consider a configuration transition from a W/S/C/S/C/F configuration to a W/S/W/S/W/F configuration, during which the cement sheath at both annuli A and B are replaced by drilling or reservoir fluids. A schematic of a borehole with axial transition at both annuli A and B is shown in FIG. 18, in which a transmitter 901 and multi-receiver arrays 903, 904 and 905 are provided. Receiver array 904 is shown with n receivers $R_1 \ldots R_n$. The receiver arrays 903, 904 and 905 are placed at various locations, including in the intact wellbore POS 1

(with fluid stack 910, inner casing 920, inner cement annulus 930a, outer casing 940, outer cement annulus 950a and formation 960), the transition region POS 2 and a fluid occupied double-cased hole POS 3 (with fluid stack 910, inner casing 920, fluid 930b in the inner annulus, outer casing 940, fluid 950b in the outer annulus, and formation 960), to extract the local acoustic signatures.

Figure 19:
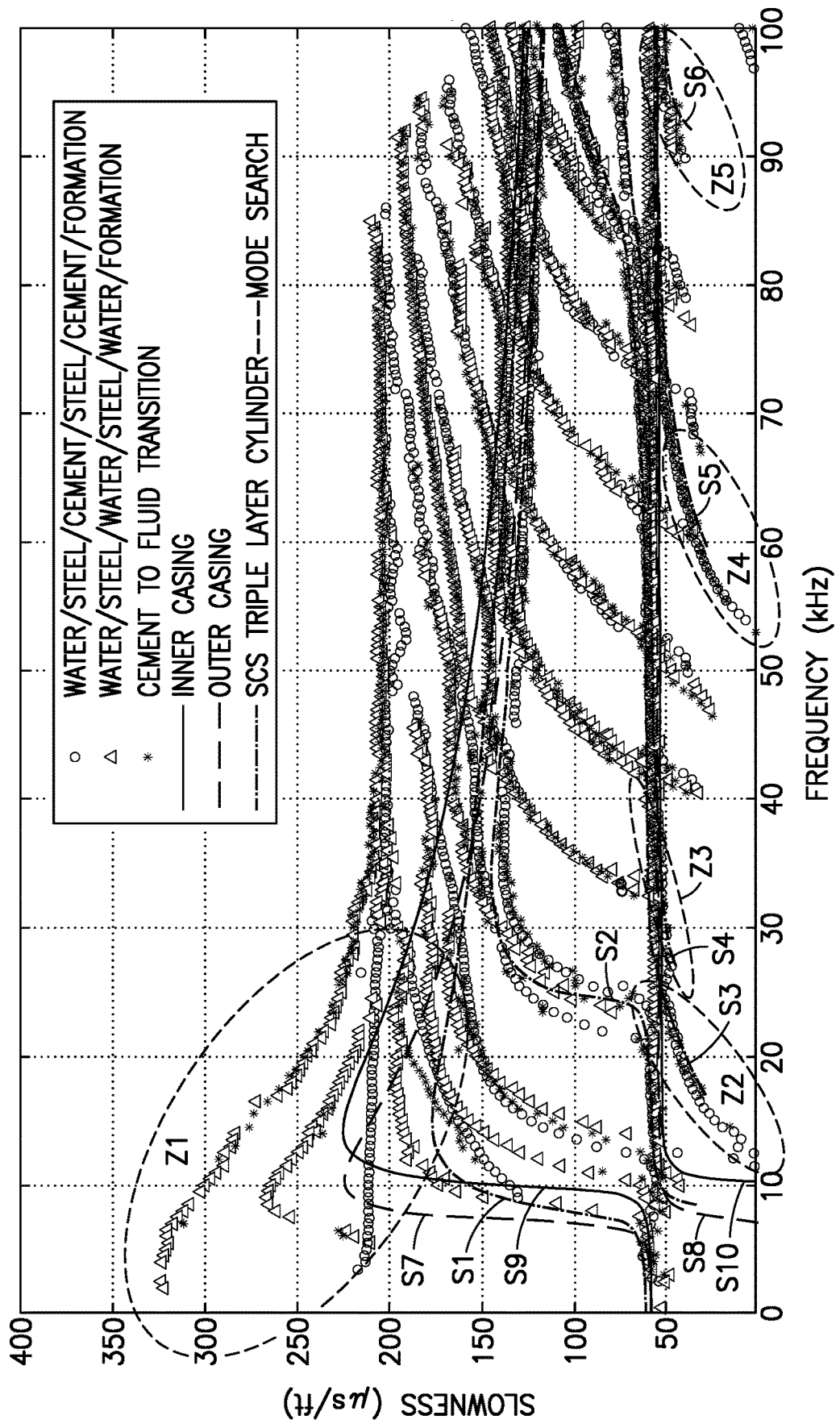
FIG. 19 is a diagram showing slowness dispersion curves in a double-cased wellbore with a cement-fluid transition zone as shown in FIG. 18. The circles and triangular dots are dispersion curves respectively extracted at Pos 1 and Pos 3 shown in FIG. 18, while the asterisks are those obtained at the cement-fluid transition region Pos 2 of FIG. 18. The solid lines denote the skeleton modes for the wellbore with different configurations.
Figure 20B:
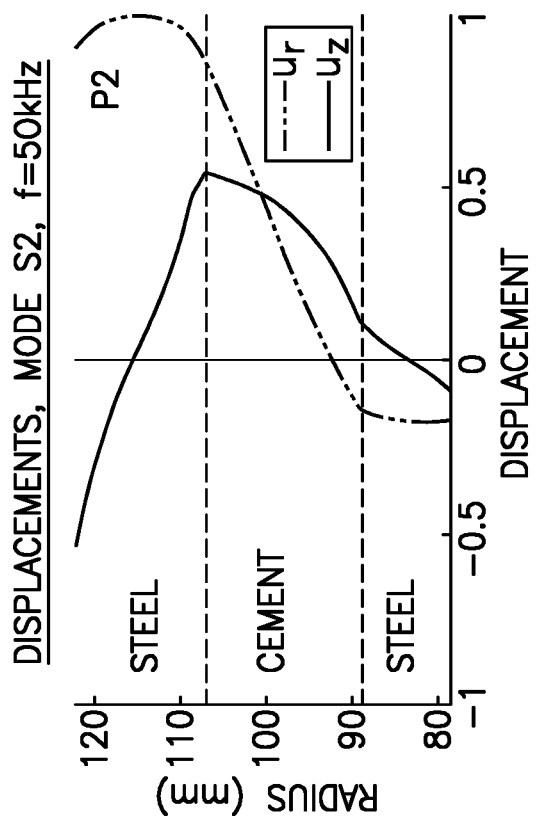
FIGS. 20a-20f are sample normalized displacement wave structures for a steel-cement-steel triple layer cylinder.
Figure 20A:
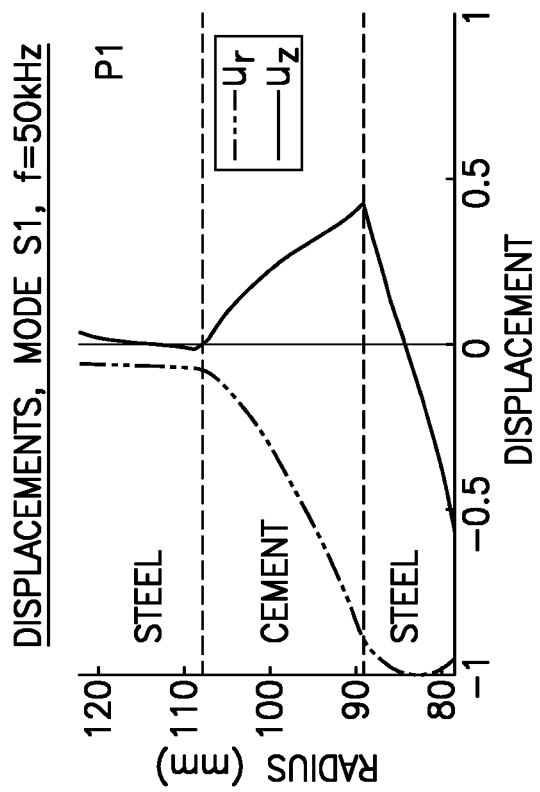
Figure 20D:
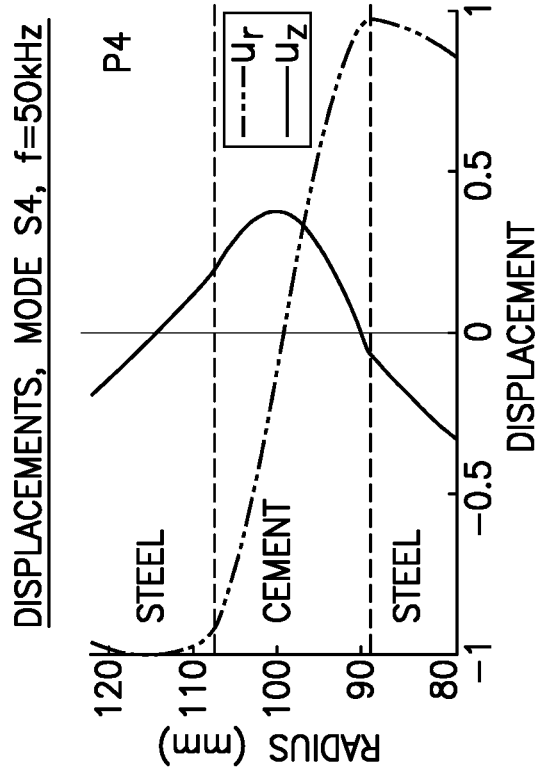
Figure 20C:
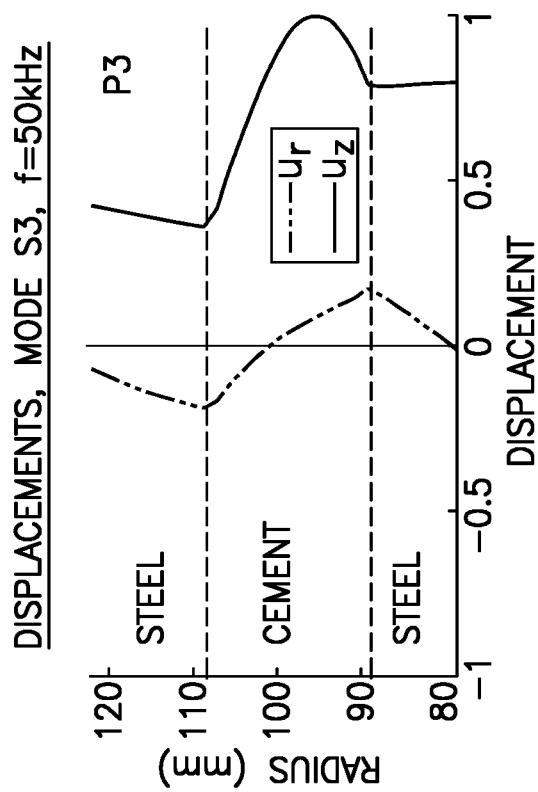
Figure 20F:
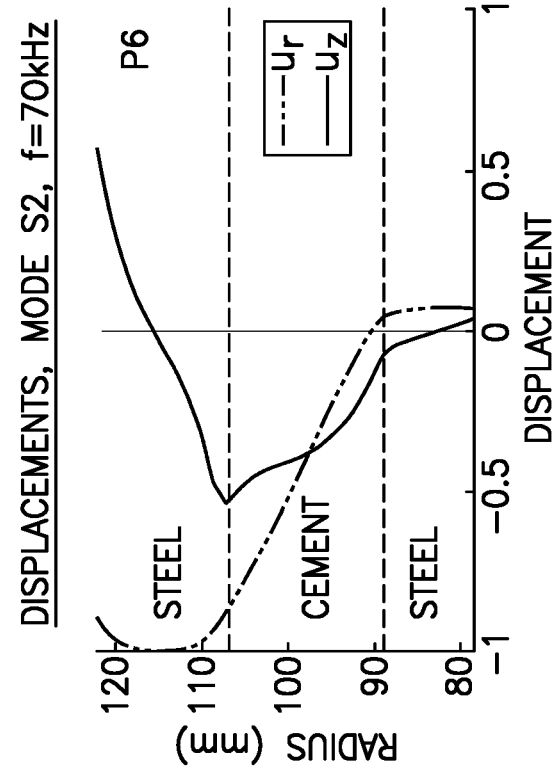
Figure 20E:
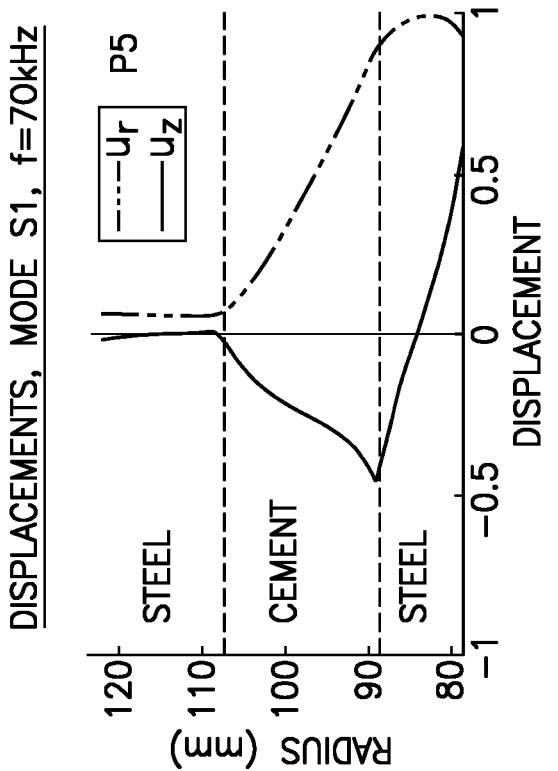

The slowness dispersion curves that are generated in a wellbore with an axial cement-fluid transition at annuli A and B are shown in FIG. 19. The circles and triangles are dispersion curves, respectively, extracted at Pos 1 and Pos 3, while the asterisks are these obtained at the cement to fluid transition region Pos 2. Skeletal modes S1 to S6 (shown as dash-dot-dash lines) relate to a S/C/S skeleton, while skeletal modes S7 to S10 relate to a skeleton with separated metal casings. As a skeleton transformation occurs from an intact wellbore with a W/S/C/S/C/F configuration to a cased-hole with W/S/W/S/W/F configuration, the dispersion curves obtained at Pos 2 depend on the spatial averaging of material properties that exhibit signatures of both the configurations, which can be used to roughly locate the cement to fluid transition.

In one embodiment, a selective guided wave modal actuation has been conducted to further characterize the cement-fluid transition. More particularly and for purposes of illustration, assume that the transmitter is placed at the W/S/C/S/C/F side of the double-cased wellbore for which the skeleton is a S/C/S triple layer cylinder. To effectively detect the cement-fluid transition at the annulus A and B, guided wave modes that are of high energy concentration in the cement annulus are desirable. Waves with outer-plane dominant displacement components on the inner wellbore surface can be efficiently actuated by a pressure transmitter.

Figure 21A:
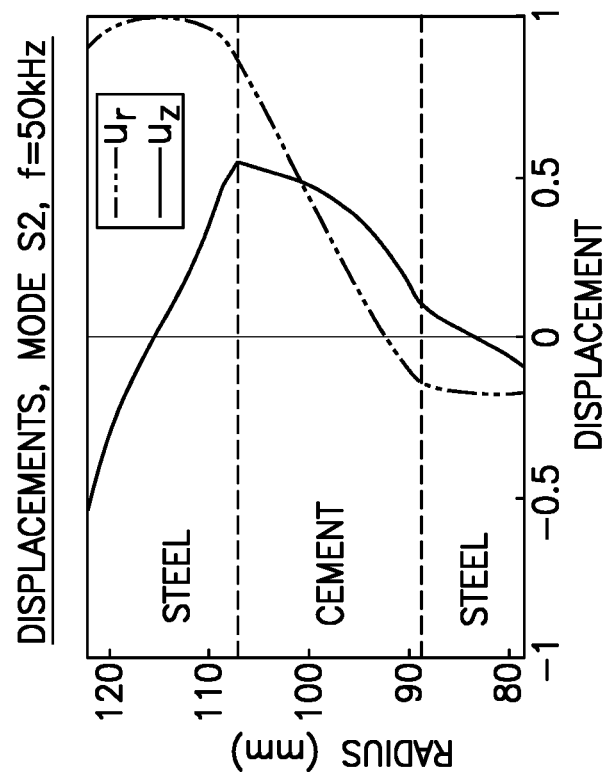
FIGS. 21a and 21b are displacement and stress modal shapes of S2 mode at 50 kHz in a steel-cement-steel triple layer cylinder.
Figure 21B:
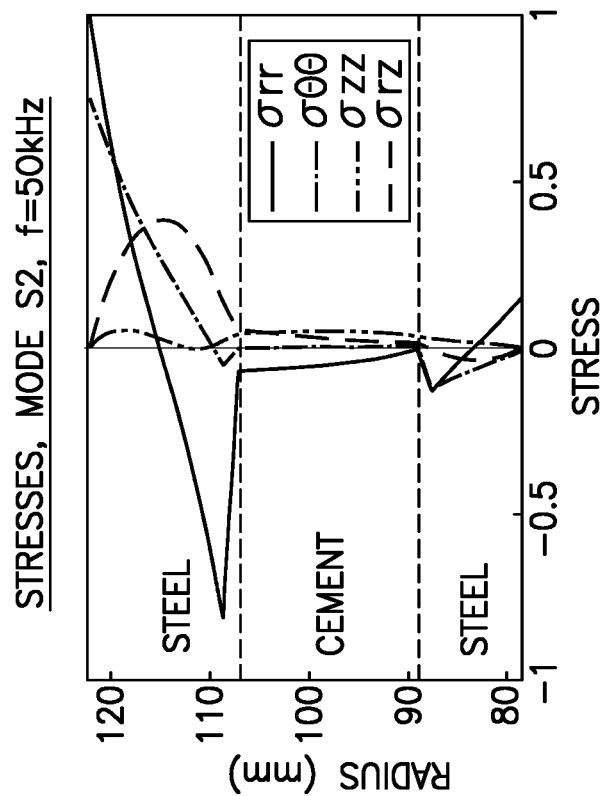

FIGS. 20a-20f show sample displacement modal shapes in a S/C/S triple layer cylinder for points P1 to P6 marked in the dispersion plot of FIG. 2 for an intact borehole (W/S/C/S/C/F configuration), with ur representing radial displacement and $u_z$ representing axial displacement. Analysis indicates that the S2 mode at 50 kHz is an ideal candidate for cement-fluid transition characterization in both annuli because the particle displacement is relatively large in both annuli. The field displacement and stress distributions of S2 mode at 50 kHz through thickness of the SCS triple layer cylinder are shown respectively in FIGS. 21a and 21b.

Figure 22:
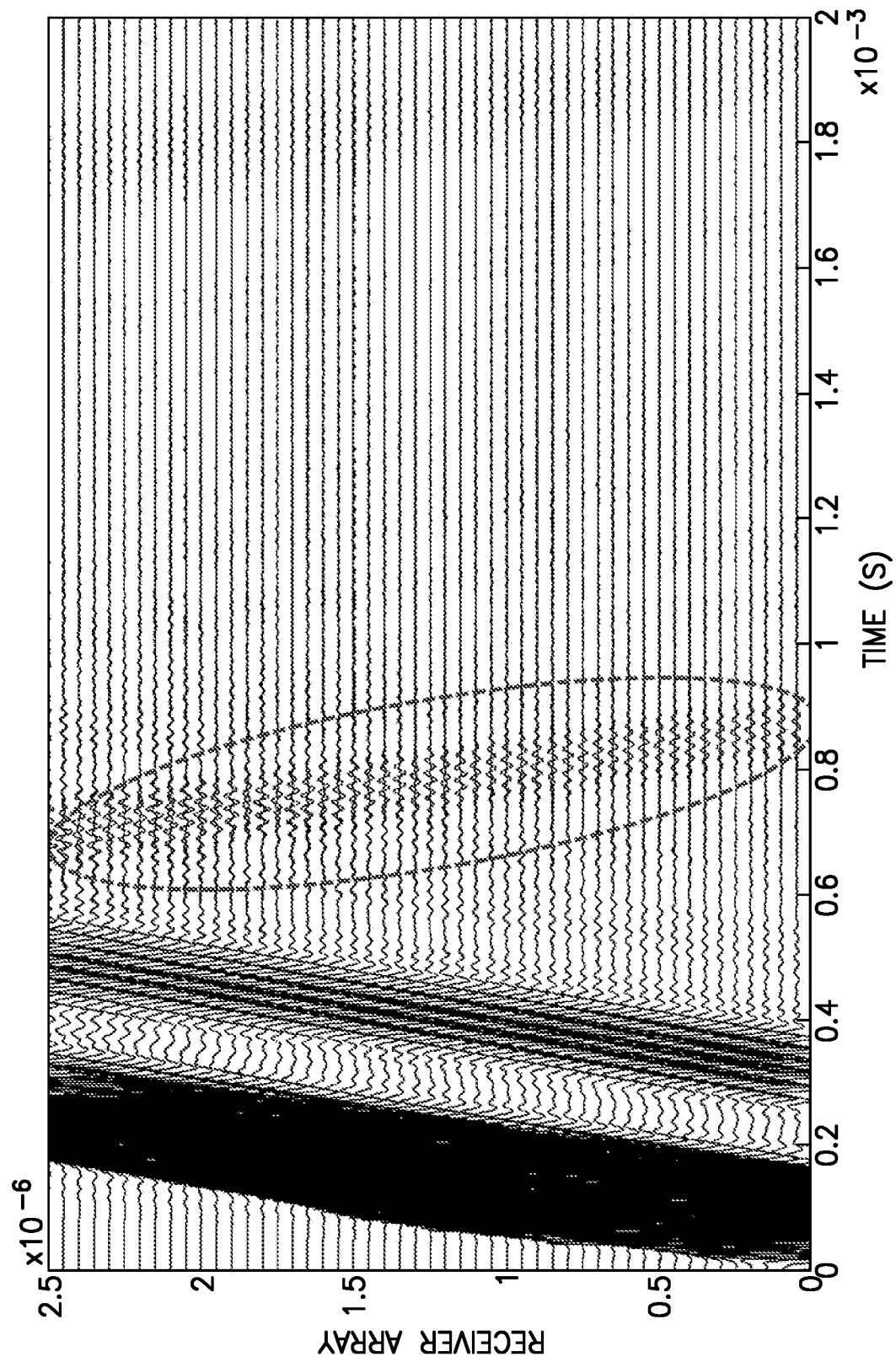
FIG. 22 are time domain signal waveforms for the S2 mode at 50 kHz. The portions of the waveforms that are within the dashed oval indicate the reflection signals from the cement-fluid transition.

A multi-element comb-like transducer such as described with respect to FIG. 17a has been designed to actuate the desired S2 mode at 50 kHz. A receiver array has been used to collect the transmission signals. The A-scan signals from primary S2 excitation at 50 kHz in a double-cased hole with W/S/C/S/C/F configuration are shown in FIG. 22. Reflection signals are observed as noted in FIG. 22. The reflection signals can be manipulated for accurate characterization of cement-fluid transition. In particular, the amplitudes of the reflections may be associated with the severity of the reflections, and the time-of-flight may indicate the location of the axial anomalies as described hereinafter.

Figure 23:
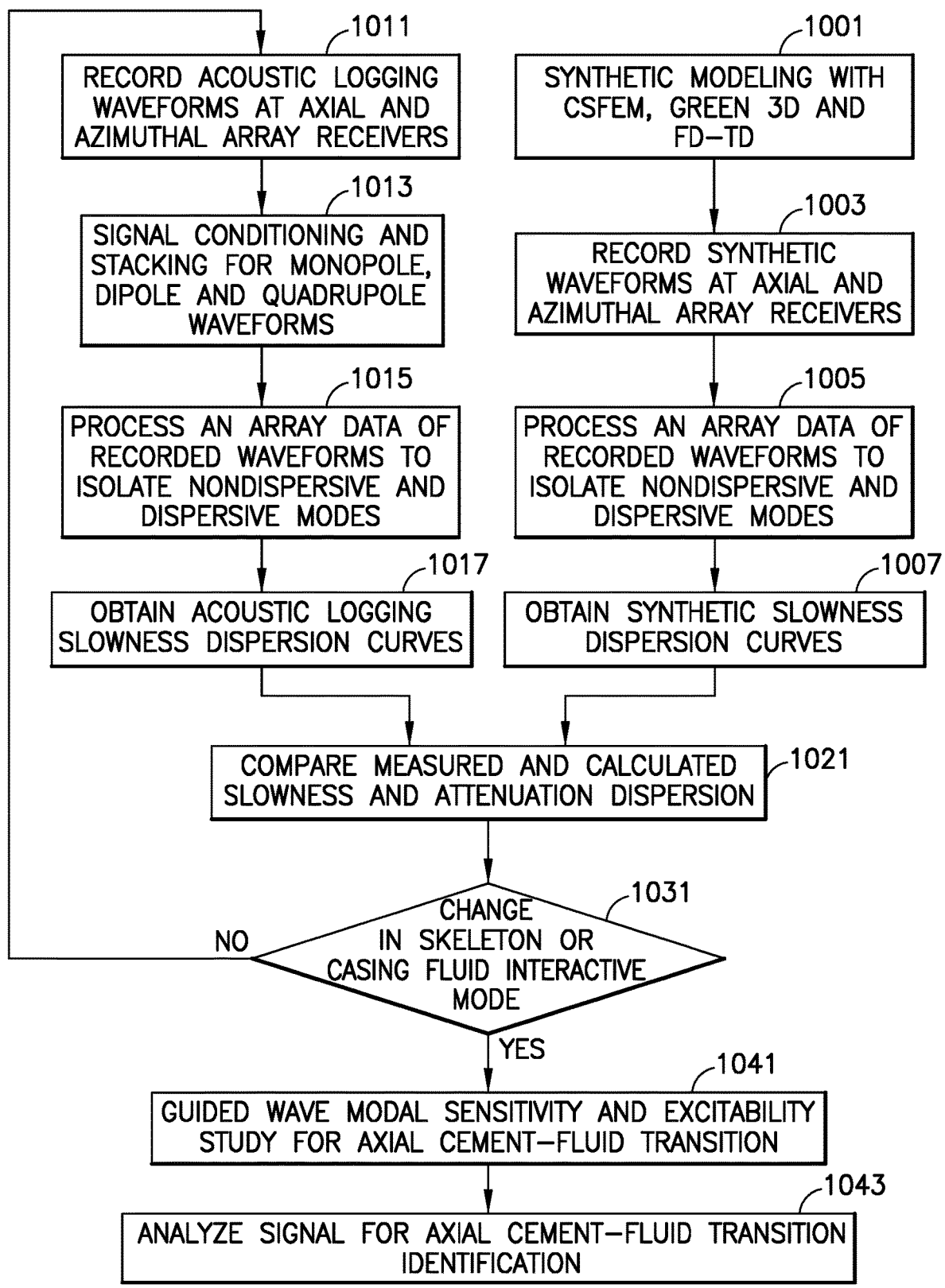
FIG. 23 is a flowchart of another method wellbore damage characterization.

Based on the foregoing, additional methods are presented for characterizing multi-string cased wells using wide frequency bandwidth signals including precisely locating locations of cement quality transition in doubly cased wells. In one embodiment shown in FIG. 23, at 1001, at least one model is obtained for modeling acoustic tools in a geological formation. The model may be a synthetic model such as CSFEM or finite difference time domain (FD-TD), and/or an analytical model. With the embodiment of FIG. 23 showing the use of a synthetic model, synthetic wideband waveforms generated by a wide bandwidth monopole, dipole or quadrupole source and detected by an axial array of receivers are recorded at 1003. The recorded waveforms are processed at 1005 using a modified matrix pencil method in order to generate at 1007 synthetic slowness dispersion curves over the wideband. In one embodiment, steps 1001-1007 are conducted for the W/S/C/S/C/F configuration shown in FIG. 1 and the results are stored in electronic and/or hard copy format. In another embodiment, steps 1001-1007 are conducted for multiple configurations (e.g., FIGS. 1, 3, 6, 8, 10, 12 and 14) and the results for each configuration is stored in a desired format. In one embodiment, steps 1001-1007 are conducted for multiple dual string well geometries (e.g., different casing radii, different casing thicknesses, different annulus thicknesses, etc.) for the configuration shown in FIG. 1 or for multiple configurations and the results are stored in a desired format. In one embodiment, the slowness dispersion curves for each well geometry are separately kept together as a set.

At 1011, wideband acoustic logging waveforms received at the receivers of a tool (modeled at 1001) which was placed downhole in a double-cased wellbore are recorded. At 1013, the recorded waveforms are conditioned and stacked, and at 1015 the conditioned and stacked waveforms are processed to isolate nondispersive and dispersive modes. At 1017, slowness dispersion curves are generated using the modified matrix pencil method.

At 1021, the slowness dispersion curves generated at 1017 from the data obtained from the borehole tool are compared to the synthetic slowness dispersion curves generated at 1007. The comparison may be done utilizing a least squares fit or other comparison techniques and/or visually. In one aspect, skeletal modes are identified in order to determine whether the investigated double-cased wellbore has a S/C/S skeleton as in FIGS. 2, 7 and 13, or whether the skeleton of the double-cased wellbore has separated metal casings (e.g., S/W/S) as in FIGS. 4, 9, and 11. The skeletal modes may also be identified in order to determine whether the investigated double-cased wellbore has a S/C/S/C skeleton as in FIG. 15. In particular, if five (or six) skeletal modes are found at expected frequency ranges and slownesses, it may be concluded that the first and second anuli are well cemented. If more than six skeletal modes are found, it may be concluded that the first annulus is well cemented and the second annulus contains cement but has a weak bond or slip at the $5^{th}$ interface. If only four skeletal modes are found, it may be concluded that the first annulus contains liquid.

In addition to the skeletal mode identification, lower frequency (e.g., between about 0 kHz and 30 kHz, or a portion thereof) casing-fluid interaction modes may be identified and compared to one or more of the stored dispersion curve plots by steps 1001-1007. If, for a S/C/S skeleton, increases in the slownesses associated with the casing-fluid interaction modes are found (relative to the slownesses for the well-cemented arrangement of FIG. 1), it may be concluded that the inner annulus is cemented and the outer annulus is fluid-filled. Of course, if a reference dispersion curve plot for a W/S/C/S/W/F configuration is generated, the comparison at 1021 will show such a match. Similarly, for a skeleton with the metal casings separated by liquid, the slownesses of the casing-fluid interaction modes may be used to distinguish whether the outer annulus is cemented or not (see FIG. 9). Likewise, the slownesses of the casing-fluid interaction modes may be used to identify degraded cement in the second annulus (see FIG. 11) or to identify debonding at the $4^{th}$ interface (see FIG. 13).

It will be appreciated that the comparison between the measured and calculated slowness dispersions at 1021 may be conducted at each depth of the borehole that acoustic logging is conducted. Thus, as a logging tool is moved up the borehole, the calculated slowness dispersions may change. Thus, at 1031, a determination is made as to whether the skeletal modes and/or the lower frequency casing-fluid interaction modes are changing. If not, then it may be concluded that there is no change in the double casing borehole structure (such as the cement integrity). However, if such skeletal modes and/or lower frequency casing-fluid interaction modes appear to be changing from one depth to another, then, in one embodiment, at 1041, in addition to running the wideband acoustic logging, a guided wave modal actuation using a narrowband transmitter such as the comb-like phased array transducer of FIGS. 17a and 17b is used to generate a narrowband signal at a desired frequency (e.g., 50 kHz) and the resulting waveforms are detected. In one embodiment, the narrowband tone burst signal is chosen to excite a selected guided wave mode that has major acoustic energy concentrated in the cement annulus of interest. With the acoustic wave propagating through the cement to fluid transition, the acoustic energy is reflected due to the impedance mismatch between the cement section and the fluid. The detected signal is then analyzed at 1043 to locate reflection signals such as in FIG. 22, or other indications of a changing borehole structure such as phase shifts. Based on these indications, (e.g., time-of-flight of the reflection given the wave speed of the acoustic mode and the transmitter location), a determination is made as to the location of the transition. Of course, where the transition is gradual, a determination can be made as to the location of the start of the transition and the location where the transition ends and a new configuration is established.

Figure 24B:
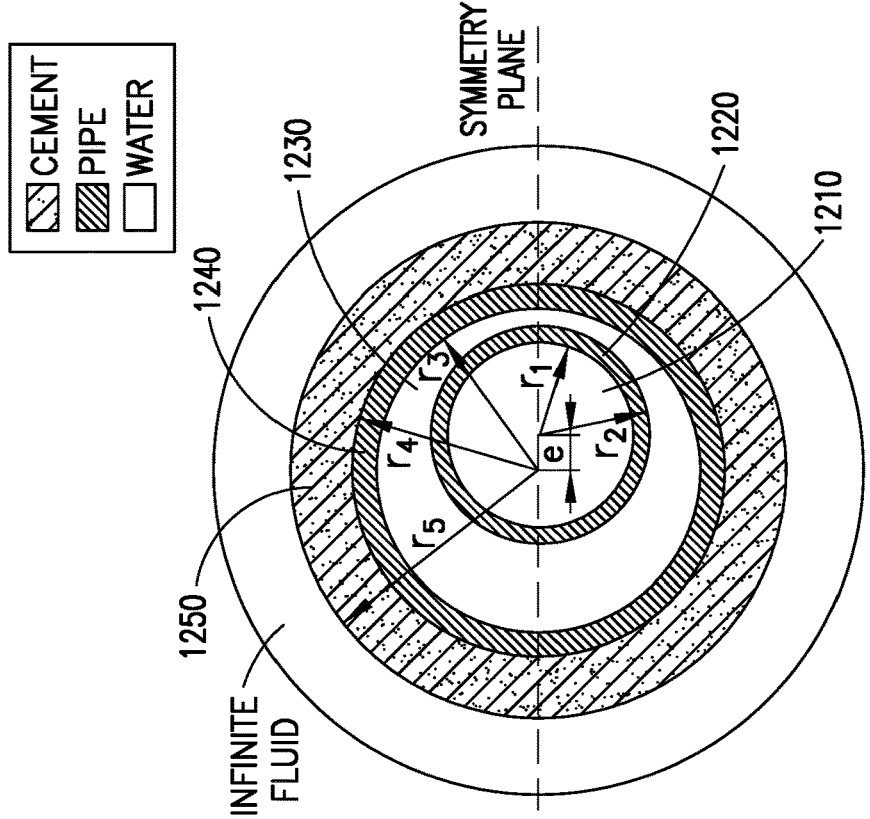
FIGS. 24a and 24b are schematic cross-sectional diagrams of 50% eccentered double strings immersed in infinite fluid with a free double string, and a cemented double string, respectively.
Figure 24A:
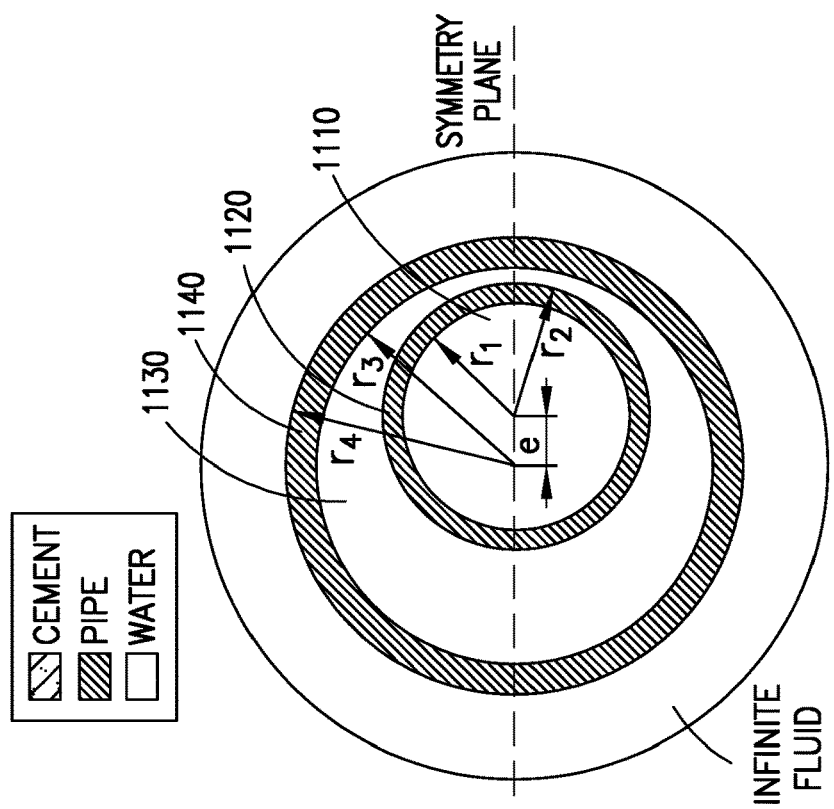

In accord with another aspect, wide frequency bandwidth signals were used to analyze eccentered double string boreholes. FIG. 24a is a cross-sectional diagram of a 50% eccentered free double string immersed in fluid. In particular, FIG. 24a shows a double-cased wellbore configuration with water or mud 1110 inside the inner casing 1120, a water annulus A 1130 between the inner casing and the outer casing 1140, and infinite fluid 1150 outside the outer casing 1140, with the inner casing 1120 (50%) eccentered relative to the outer casing 1140. FIG. 24b shows a double-cased wellbore configuration with water or mud 1210 inside the inner casing 1220, a water annulus A 1230 between the inner casing and the outer casing 1240, cement 1250 outside the outer casing 1240, and infinite fluid 1260 beyond the cement 1250, with the inner casing 1220 (50%) eccentered relative to the outer casing 1240.

In the arrangements of FIGS. 24a and 24b, the casing eccentricity is defined according to $$E = \frac{e}{r_2 - r_1} \times 100\%,$$

where $r_1$ is the inner diameter of the inner casing and $r_2$ is the outer diameter of the inner casing. The geometric and material properties for the double string system of FIGS. 24a and 24b are given in Table II.

Figure 25:
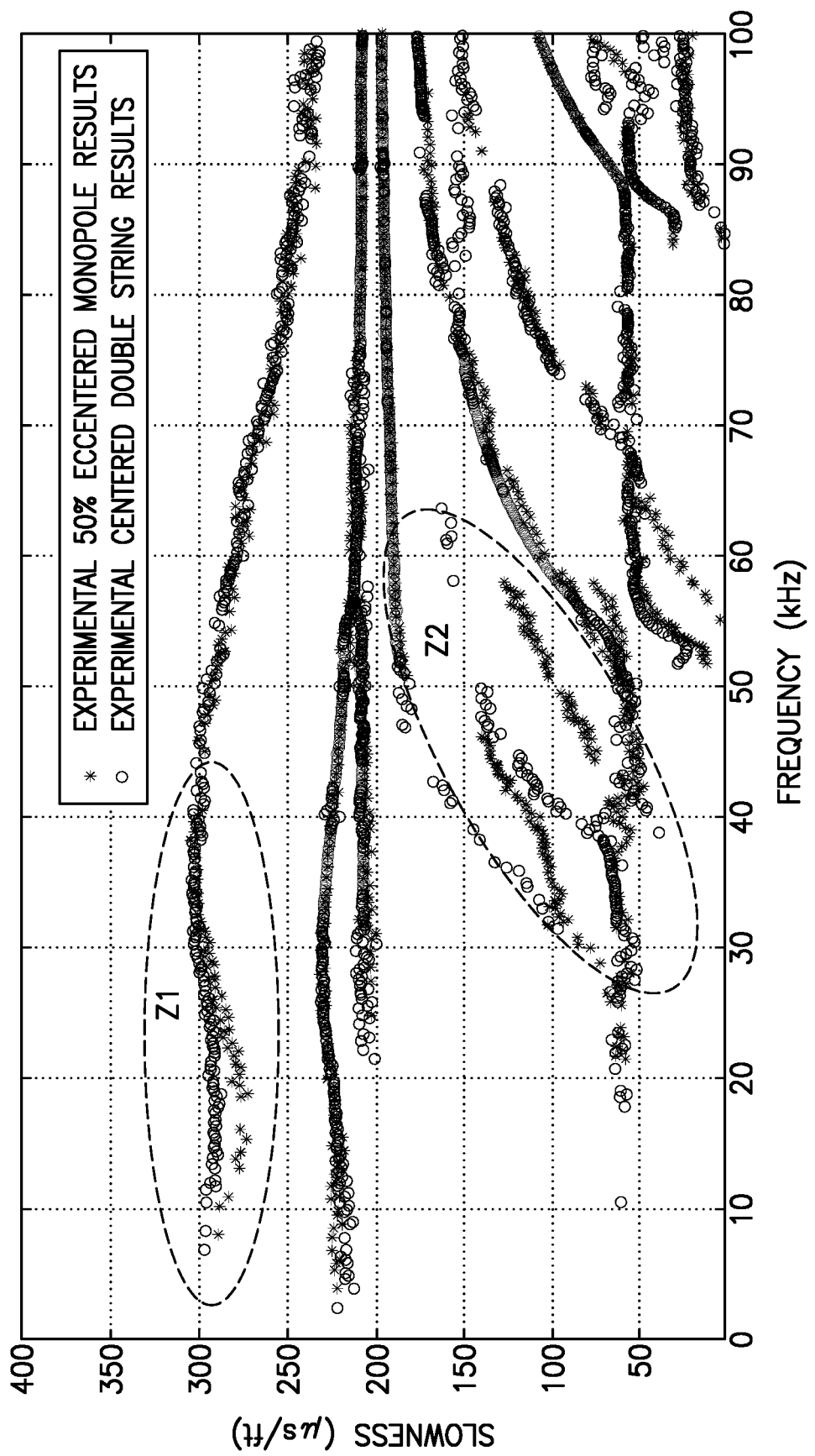
FIG. 25 is a diagram showing slowness dispersion curves for concentric and 50% eccentered cemented double strings. The solid dots and open circles, respectively, indicate concentric and 50% eccentered results.

In FIG. 25, the slowness dispersion curves for concentric and 50% eccentered cemented double strings are seen. The closed circles and the open circles, respectively indicate concentric and 50% eccentered results. It is observed that the slowness dispersion for the concentric and eccentered geometries coincide in most of the regions. However, the presence of moderate casing eccentricity induces a slowness reduction at low frequency casing-fluid interaction modes and cut-off modes in identified regions Z1 and Z2.

Figure 26:
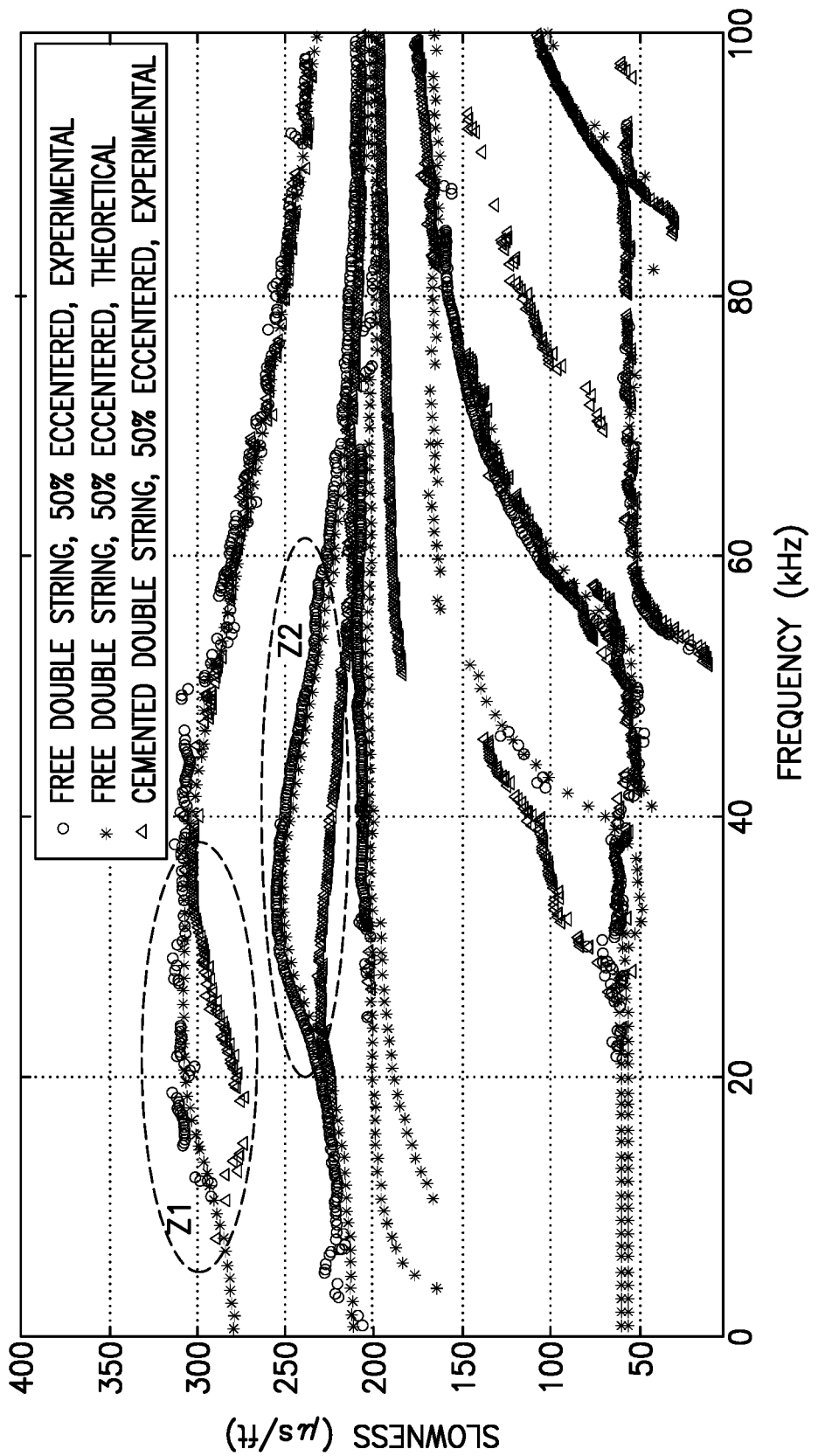
FIG. 26 is a diagram showing slowness dispersion curves for free and cemented double strings with identical eccentricity (50%). The circles and dots, respectively, represents for experimental and numerical dispersions of cemented double strings, while the triangles indicate those extracted from a free double string.

In FIG. 26, the slowness dispersion curves are plotted for free and cemented double strings with identical eccentricity (50%). The circles and dots, respectively, represent experimental and numerical dispersions of cemented double strings (FIG. 24b), while the triangles indicate those extracted from free double string (FIG. 24a). The skeletons for both the two geometries are the inner and outer steel casings with 50% eccentricity. Therefore, no change should occur at skeleton and fluid resonant modes regions. It is observed from FIG. 26 the only changes on the slowness dispersions occur at low frequency casing-fluid interaction mode region Z1. Therefore, the features can be used to characterize cement annulus B in double string geometries.

Thus, in one aspect, in characterizing a multi-string borehole, and particularly with respect to FIGS. 16 and 23, the modeling of different dual string well geometries may include the modeling of eccentered casings for the configuration shown in FIG. 1 or for multiple configurations. Then, after wideband acoustic logging is conducted, the resulting slowness dispersions may be compared to a database of calculated slowness dispersions which includes eccentered casing examples. In this manner, a determination may be made not only as to the presence or lack thereof of cement in the annuli of the dual string wellbore and the possibility of a slip at certain interfaces, but also of eccentering.

In one aspect, some of the methods and processes described above, such as filtering and TKO processing of sonic signals and the fitting of dispersion curves to model curves are performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a

TABLE II

| | Dimensions | | | | | Material properties | | |
|---|---|---|---|---|---|---|---|---|
| | $r_1$ (mm) | $r_2$ (mm) | $r_3$ (mm) | $r_4$ (mm) | $r_5$ (mm) | $\rho_i$ (kg/m³) | $V_P$ (m/s) | $V_s$ (kg/m³) |
| Fluid | 19.8755 | 22.2250 | 27.50 | 31.75 | 38.81 | 1000 | 1500.00 | 0 |
| Steel | | | | | | 7890 | 5790.00 | 3100.00 |
| Cement | | | | | | 1900 | 3625.00 | 2015.00 | series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of characterizing the annuli of a multi-string wellbore, comprising:
    utilizing at least one tool in the wellbore to excite wideband acoustic energy and detect resulting wideband signals at a location in the wellbore;
    processing the detected wideband signals to obtain indications of wideband casing-formation phase slowness dispersions in the wellbore;
    comparing the indications of wideband casing-formation phase slowness dispersions in the wellbore to reference wideband model casing-formation phase slowness dispersions; and
    estimating status of cement or lack of cement in the annuli at said location based on said comparing.

2. The method of claim 1, wherein said wideband signals include a range of at least 5 kHz to 70 kHz.

3. The method of claim 1, wherein said wideband signals range from at least 5 kHz to 100 kHz.

4. The method of claim 1, wherein said wideband signals range from at least 1 kHz to 100 kHz.

5. The method of claim 1, wherein said comparing comprises comparing indications of wideband casing-formation phase slowness dispersions in the wellbore to sets of a plurality of reference wideband model casing-formation phase slowness dispersions, each set of said sets being for a different wellbore configuration.

6. The method of claim 5, wherein said sets include a water-inner metal-inner cement-outer metal-outer cement-formation configuration, a water-inner metal-water-outer metal-cement-formation configuration, a water-inner metal-cement-outer metal-water-formation configuration, and a water-inner metal-water-outer metal-water-formation configuration.

7. The method of claim 6, wherein said sets further include a water-inner metal-inner cement-outer metal-outer cement-formation configuration with a slip between the outer metal and the outer cement, and a water-inner metal-inner cement-outer metal-outer cement-formation configuration with a slip between the outer cement and the formation.

8. The method of claim 1, wherein said comparing comprises identifying skeletal modes in said indications of wideband casing-formation phase slowness dispersions.

9. The method of claim 8, wherein said estimating comprises determining the presence of cement in both annuli where said indications of wideband casing-formation phase slowness dispersions in the wellbore include at least five skeletal modes.

10. The method of claim 8, wherein said estimating comprises determining the lack of cement in the first annulus where said indication of wideband casing-formation phase slowness dispersion in the wellbore include fewer than five skeletal modes.

11. The method of claim 10, wherein said comparing comprises comparing casing-fluid interaction modes at frequencies below 30 kHz in order to identify the presence or lack of cement in the second annulus.

12. The method of claim 8, wherein said comparing comprises comparing casing-fluid interaction modes at frequencies below 30 kHz in order to identify the presence or lack of cement in the second annulus.

13. The method of claim 8, wherein said comparing comprises comparing casing-fluid interaction modes at frequencies of between 30 kHz and 60 kHz in order to identify the presence or lack of eccentering of an inner casing within an outer casing.

14. The method of claim 1, further comprising:
    repeating said utilizing, processing, comparing and estimating at multiple locations in wellbore in order to estimate status of cement or lack thereof in the annuli at said multiple locations; and
    determining a change between two locations in said estimate of status of cement or lack of cement in the annuli.

15. The method of claim 14, further comprising:
    generating a narrowband signal at a desired frequency at a second of said two locations and detecting resulting waveforms; and
    analyzing said resulting waveforms to obtain an indication of a location of transition from a first estimate of quality of cement or lack thereof in the annuli to a second different estimate of status of cement or lack of cement in the annuli.

16. The method of claim 15, wherein said analyzing said resulting waveforms comprises locating reflection signals in said resulting waveforms.

17. A method for characterizing the annuli of a double-cased wellbore traversing a formation, comprising:
    obtaining reference dispersions for an intact wellbore with well-cemented first and second annuli;
    deploying an acoustic logging tool in the double-cased wellbore, the acoustic tool including an acoustic source that generates wide band excitation signals and a receiver array that records resulting wideband signal wavetrains;

processing the detected wideband signals to obtain indications of measured wideband casing-formation phase slowness dispersions in the wellbore;

comparing the measured wideband slowness dispersions and said reference dispersions; and identifying differences in said measured and reference dispersions in order to characterize at least one of (1) the presence or the lack of cement in at least one of said first and second annuli, and (2) bonding weakness of at least one of a cement-casing interface and a cement-formation interface.

18. The method of claim 17, wherein said wideband signals include a range of at least 5 kHz to 70 kHz.

19. The method of claim 17, wherein said wideband signals range from at least 5 kHz to 100 kHz.

20. The method of claim 17, wherein said wideband signals range from at least 1 kHz to 100 kHz.

\* \* \* \* \*